United States Patent [19]
Deeba et al.

[11] Patent Number: 5,874,057
[45] Date of Patent: Feb. 23, 1999

[54] LEAN NO$_X$ CATALYST/TRAP METHOD

[75] Inventors: Michel Deeba, North Brunswick; Jennifer S. Feeley, Clinton; Robert J. Farrauto, Westfield, all of N.J.

[73] Assignee: Engelhard Corporation, Iselin, N.J.

[21] Appl. No.: 500,657

[22] Filed: Jul. 12, 1995

[51] Int. Cl.[6] .................................................. B01D 53/56
[52] U.S. Cl. .................................... 423/239.1; 423/213.5
[58] Field of Search .............................. 423/239.1, 213.5

[56] References Cited

U.S. PATENT DOCUMENTS

| | | | |
|---|---|---|---|
| 3,931,050 | 1/1976 | Asano et al. | 423/213.5 |
| 4,105,590 | 8/1978 | Koberstein et al. | 502/151 |
| 4,261,862 | 4/1981 | Kinoshita et al. | 502/304 |
| 4,274,981 | 6/1981 | Suzuki et al. | 502/178 |
| 4,289,737 | 9/1981 | Acres et al. | 423/213.5 |
| 4,552,733 | 11/1985 | Thompson et al. | 423/213.5 |
| 4,742,038 | 5/1988 | Matsumoto | 502/303 |
| 4,849,398 | 7/1989 | Takada et al. | 502/303 |
| 4,880,764 | 11/1989 | Imai et al. | 502/326 |
| 4,902,664 | 2/1990 | Wan | 502/300 |
| 4,977,129 | 12/1990 | Ernest | 502/330 |
| 5,015,617 | 5/1991 | Ohata et al. | 502/304 |
| 5,019,546 | 5/1991 | Murakami et al. | 423/213.5 |
| 5,063,192 | 11/1991 | Murakami et al. | 423/213.5 |
| 5,075,275 | 12/1991 | Murakami et al. | 423/213.5 |
| 5,128,306 | 7/1992 | Dettling et al. | 502/304 |
| 5,202,300 | 4/1993 | Funabiki et al. | 502/304 |
| 5,260,249 | 11/1993 | Shiraishi et al. | 502/304 |
| 5,316,738 | 5/1994 | Kojima et al. | 422/180 |
| 5,376,610 | 12/1994 | Takahata et al. | 502/66 |
| 5,406,790 | 4/1995 | Hirota et al. | 60/276 |
| 5,471,836 | 12/1995 | Takeshima et al. | 60/297 |

FOREIGN PATENT DOCUMENTS

| | | | |
|---|---|---|---|
| 661 098 A2 | 7/1995 | European Pat. Off. | B01J 35/04 |
| 4-130904 | 12/1993 | Japan . | |
| 6-327945 | 11/1994 | Japan | 423/213.5 |
| 07-108172 | 4/1995 | Japan . | |
| 7-108172 | 4/1995 | Japan . | |

OTHER PUBLICATIONS

Takahashi et al, "The New Concept 3–Way Catalyst for Automotive Lean–Burn Engine Storage & Reduction Catalyst" May 1995, pp. 45—48.

Miyoshi et al, "Development of New Concept Three–Way Catalyst for Automotive Lean–Burn Engines", SAE # 950809 Feb. 1995.

*Primary Examiner*—Michael L. Lewis
*Assistant Examiner*—Peter DiMauro
*Attorney, Agent, or Firm*—Richard A. Negin; Theodore J. Shatynski

[57] ABSTRACT

A NO$_x$ abatement composition comprises a NO$_x$ abatement catalyst and a NO$_x$ sorbent material which are dispersed in proximity to, but segregated from, each other on a common refractory carrier member (10). The NO$_x$ sorbent material comprises a basic oxygenated metal compound and optionally further comprises ceria. The NO$_x$ abatement catalyst contains a catalytic metal component including a platinum metal catalytic component. The catalytic metal component is segregated from the NO$_x$ sorbent material, which may be one or more of metal oxides, metal carbonates, metal hydroxides and mixed metal oxides. At least the catalytic metal component and the NO$_x$ sorbent material must be on, or comprise separate, particles; the particles may either be admixed or may be disposed in separate layers (20a, 20b) on the carrier member (10). A NO$_x$ abatement method employs the composition and includes periodically adjusting the gas being treated between lean and stoichiometric/rich operating cycles.

6 Claims, 15 Drawing Sheets

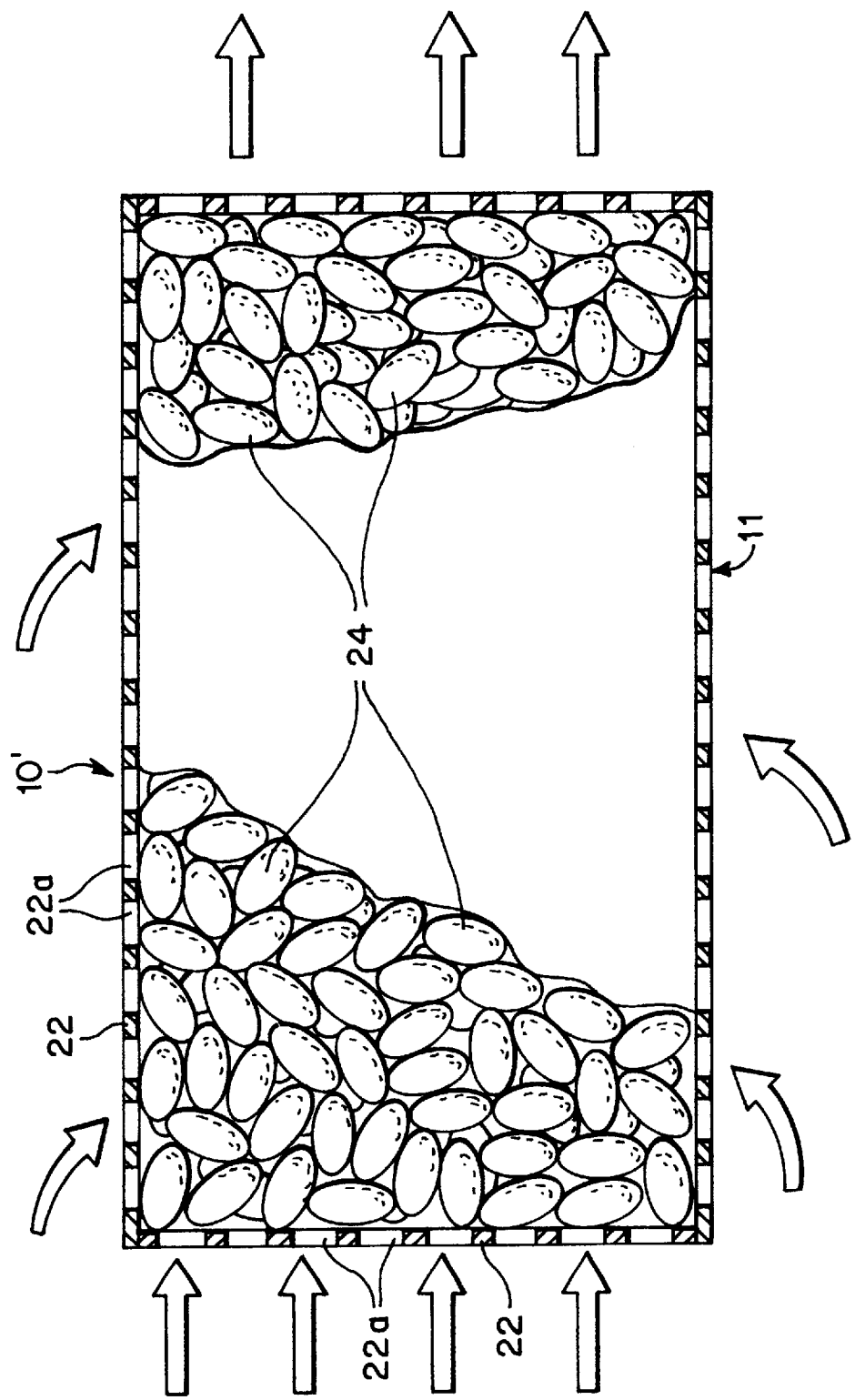

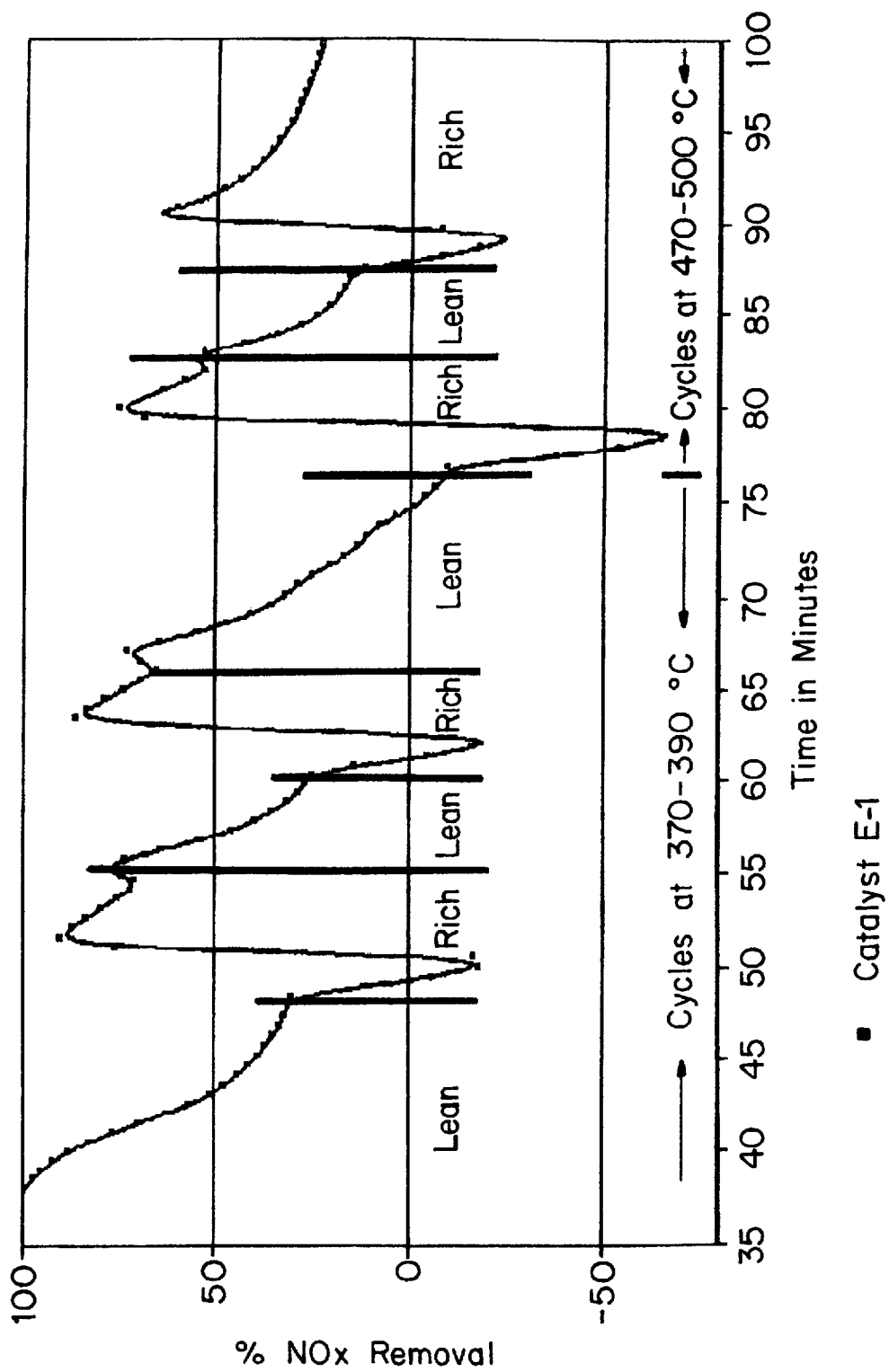

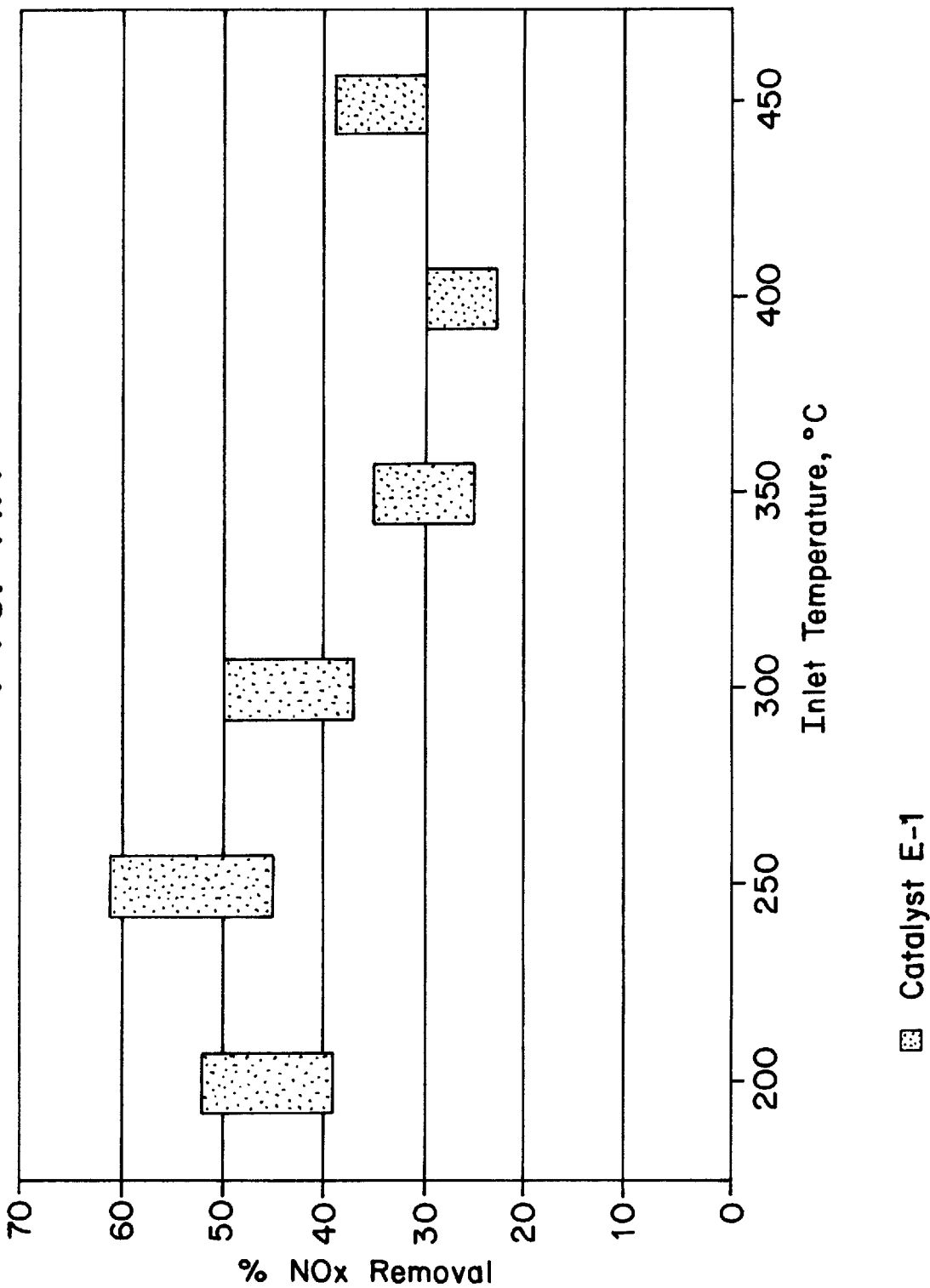

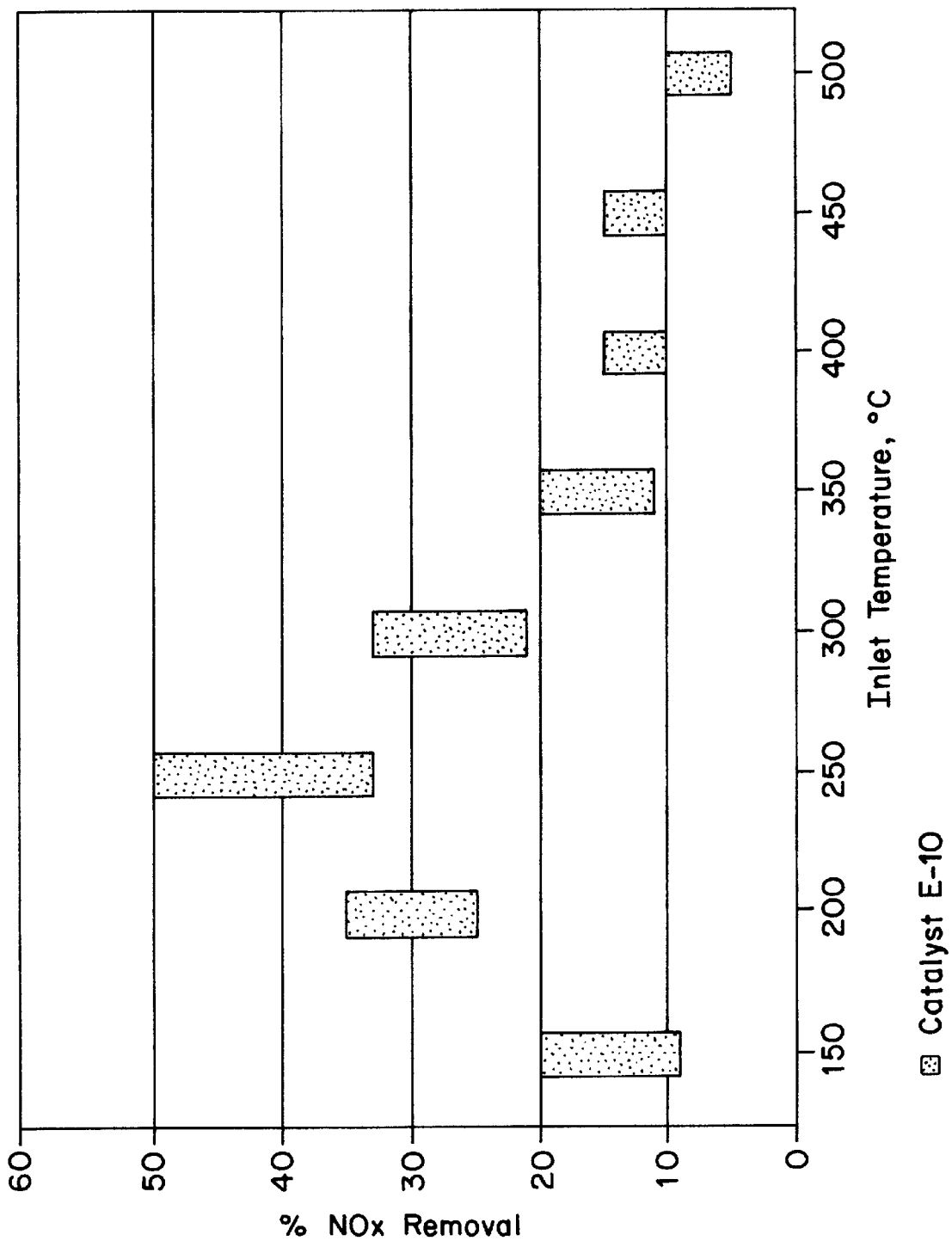

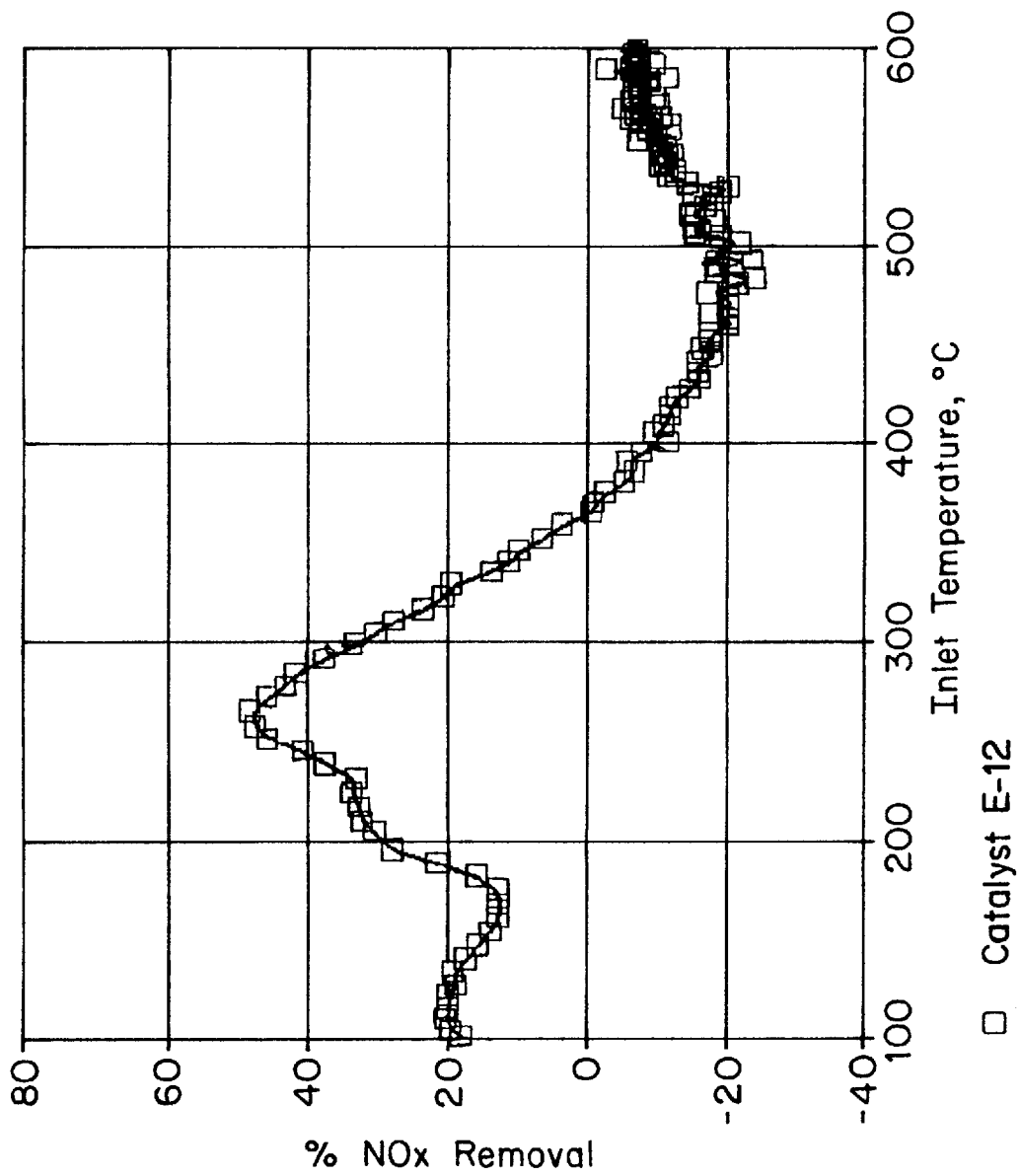

LEAN NO$_x$ CATALYST/TRAP METHOD

BACKGROUND OF THE INVENTION

1. Field of The Invention

The present invention is broadly concerned with NO$_x$ abatement, especially with NO$_x$ abatement in the exhaust gas of lean-burn internal combustion engines. More specifically, the present invention is concerned with a novel composition comprising a combination of a NO$_x$ trap (sorbent material) and a NO$_x$ abatement catalyst, and to a method of using the same.

2. Related Art

It is well-known in the art to utilize catalyst compositions, such as those commonly referred to as three-way conversion catalysts ("TWC catalysts") to treat the exhaust gases of internal combustion engines. Such catalysts have been found to successfully promote both the oxidation of unburned hydrocarbons ("HC") and carbon monoxide ("CO") and the reduction of nitrogen oxides ("NO$_x$") in the exhaust gas, provided that the engine is operated at or close to stoichiometric air/fuel conditions. However, many present day engines, especially gasoline-fueled engines used for passenger automobiles and the like, are designed to operate under lean conditions at least part of the time as a fuel economy measure. That is, the ratio of air to fuel in the combustion mixture supplied to the engine is maintained above the stoichiometric ratio so that the resulting exhaust gases are "lean", i.e., the exhaust gases are relatively high in oxygen content and relatively low in reductants content, e.g., HC, CO and/or hydrogen.

Although lean burn engines provide enhanced fuel economy, they have the disadvantage that conventional TWC catalysts cannot adequately abate the NO$_x$ component of pollutants in the gas stream. The art has devoted some effort to developing catalysts specifically designed to treat the exhaust of lean burn engines. One such effort is described in the publication *Environmental Catalysis For A Better World And Life*, Proceedings of the 1st World Congress at Pisa, Italy, May 1–5, 1995, published by the Societa Chimica Italiana of Rome, Italy. At pages 45–48 of the publication, there is an article entitled "The New Concept 3-Way Catalyst For Automotive Lean-Burn Engine Storage and Reduction Catalyst", by Takahashi et al (below referred to as "the Takahashi et al paper"). This article discloses the preparation of catalysts by impregnating precious metals, mainly platinum, and various alkaline and alkaline earth metal oxides, mainly barium oxide, and rare earth oxides on supports, mainly alumina. These catalysts were employed for NO$_x$ purification of actual and simulated exhaust gases. At page 47 of the article, there is both shown graphically in FIG. 5 and discussed in paragraph 3.1.1., "NO$_x$ Storage Mechanism", the concept of employing NO$_x$ storage compounds in conjunction with the catalytic (platinum) component, with both the NO$_x$ storage compounds and the catalytic component dispersed on a common support material. It is stated that "When precious metals were separated from the NO$_x$ storage compounds on these catalysts, the NO$_x$ storage amount drastically decreased." Paragraph 3.1.1. therefore teaches that the NO$_x$ storage compound and the platinum catalyst should be intimately admixed by being disposed on the same increment of, e.g., alumina, support as described in the catalyst preparation procedure described in paragraph 2 (page 45) and illustrated in FIG. 5.

In paragraph 3.1, page 46, testing of the catalysts is described as being carried out with simulated exhaust gases alternately under oxidizing and reducing conditions. The conclusion is drawn on the last sentence on page 46, that NO$_x$ was stored in the catalyst under oxidizing conditions and that the stored NO$_x$ was then reduced to nitrogen under stoichiometric and reducing conditions.

SAE paper 950809 published by the Society of Automotive Engineers, Inc., Warrendale, Pa., and entitled *Development of New Concept Three-Way Catalyst for Automotive Lean-Burn Engines*, by Naoto Miyoshi et al, was delivered at the International Congress and Exposition, Detroit, Mich., Feb. 27–Mar. 2, 1995. This paper, referred to below as "the SAE paper", which has authors in common with the above-mentioned Takahashi et al paper, contains a disclosure which is substantially the same as, but is more detailed than, that of the Takahashi et al paper. At page 123 of the SAE paper a correlation between basicity of the elements used as NO$_x$ storage material and NO$_x$ storage capacity is discussed as is NO$_x$ adsorption by complex oxides such as YBa$_2$Cu$_3$Oy and CuO—BaO. The discussion of mixed oxides is made with reference to items 6 and 7 of the references cited at the end of the SAE paper. The references are "Uptake of NO gas by YBa$_2$Cu$_3$Oy" by K. Tabata et al, *Chem. Lett.*, 1988, pp. 799–802 and "NO removal by adsorption into BaO—CuO binary oxides" by M. Machida et al, *J. Chem. Soc. Chem. Commun.* 1990, pp. 1165–1166. At page 125 of the SAE paper, there is a comparison of two catalysts. One catalyst comprises (a) noble metal impregnated on one increment of alumina and the NO$_x$ storage component impregnated on alumina, and the other catalyst comprises (b) both noble metal and the storage component impregnated on the same increment of alumina. The SAE paper states that catalyst (a) stored a very small amount of NO$_x$ as compared to catalyst (b) and concludes that the "storage amount increases when the noble metal is in the proximity of the storage component".

U.S. Pat. No. 5,202,300, "Catalyst For Purification of Exhaust Gas", issued on Apr. 13, 1993, to M. Funabiki et al, discloses a catalyst composition comprising a refractory support having deposited thereon an active layer containing a palladium and rhodium catalytic metal component dispersed on alumina, a cerium compound, a strontium compound, and a zirconium compound. (See the Abstract.) This patent discloses the preparation of the catalyst by impregnating alumina particles with palladium and rhodium and then combining the impregnated alumina with compounds such as cerium nitrate, strontium acetate hemi-hydrate and zirconyl acetate together with acetic acid and deionized water in a ball mill, and crushing and mixing the mixture to provide a slurry which is applied to a monolithic, cylindrical cordierite carrier. See columns 3–5 of the Funabiki et al Patent, especially Example 1 which discloses that the strontium compound is solubilized in the acidified water and impregnated into the alumina support particles together with the palladium and rhodium catalytic metal components. Example 1 as Funabiki et al, like the Takahashi et al and SAE papers referred to above, impregnates both the alkaline earth metal compound (a strontium compound in the case of Funabiki et al), and the palladium and rhodium catalytic metal components into the same increment of (alumina) support material. However, Example 2 of Funabiki et al substitutes strontium hydroxide for the strontium acetate and the limited solubility of strontium hydroxide suggests that it remains in bulk form in the finished product, admixed with the palladium and rhodium-impregnated alumina.

SUMMARY OF THE INVENTION

Generally, the present invention provides a composition containing a NO$_x$ sorbent material and a NO$_x$ abatement catalyst, the latter including one or more catalytic metal components essentially including a platinum catalytic metal component. The abatement catalyst may optionally include one or more other platinum group metal components. The composition is characterized by the catalytic metal components being segregated from the $NO_x$ sorbent material at least to the extent that the catalytic metal components and the $NO_x$ sorbent material are not dispersed on the same increment of support material. Preferably, the $NO_x$ sorbent material is a bulk material and it is substantially free of any catalytic metal components dispersed thereon. Inasmuch as ceria is not effective for $NO_x$ abatement it is not considered to be a catalytic metal component and in certain embodiments of the invention ceria may optionally be combined with the $NO_x$ sorbent material.

Specifically, in accordance with the present invention there is provided a composition for $NO_x$ abatement in a gas stream, the composition comprising a $NO_x$ abatement catalyst and a $NO_x$ sorbent material disposed in proximity to each other on a common refractory carrier member. The $NO_x$ abatement catalyst comprises a catalytic metal component comprised of a platinum catalytic metal component. The catalytic metal component is dispersed on a first refractory support material, e.g., alumina. The $NO_x$ sorbent material comprises at least one basic oxygenated metal compound, e.g., strontium oxide or strontium hydroxide, which is segregated from the platinum group metal catalytic component, at least to the following extent. When the $NO_x$ sorbent material is dispersed on a refractory support material, the catalytic metal component and the $NO_x$ sorbent material are not dispersed on the same increment of refractory support material. When the $NO_x$ sorbent material is present in bulk form, the catalytic metal component is not impregnated into the bulk $NO_x$ sorbent material.

In one aspect of the invention the catalytic metal component further comprises at least one other platinum group metal catalytic component in addition to the platinum catalytic metal component.

In another aspect of the invention, the $NO_x$ sorbent material is selected from the group consisting of one or more of metal oxides, metal carbonates, metal hydroxides and mixed metal oxides. Optionally, the $NO_x$ sorbent material may further comprise ceria, e.g., bulk ceria.

Yet another aspect of the invention provides that the $NO_x$ sorbent material comprises a mixed metal oxide selected from the group consisting of one or more of barium strontium tungstate, barium strontium niobate, strontium titanate, barium zirconate, barium silicate and barium strontium titanate.

In another aspect of the invention, the $NO_x$ sorbent material is selected from the group consisting of one or more of metal oxides, metal hydroxides, metal carbonates, and mixed metal oxides, wherein the metals of the metal oxides, metal hydroxides and metal carbonates and at least one of the metals of the mixed metal oxides are selected from the group consisting of lithium, sodium, potassium, rubidium, cesium, magnesium, calcium, strontium and barium.

One aspect of the present invention provides that the $NO_x$ abatement catalyst is admixed with the $NO_x$ sorbent material; another aspect of the invention provides that the $NO_x$ abatement catalyst is disposed as a first discrete layer on the refractory carrier member and the $NO_x$ sorbent material is disposed as a second discrete layer on the refractory carrier member. Yet another aspect of the invention provides that the first discrete layer (the $NO_x$ abatement catalyst) comprises an underlayer disposed on the carrier member and the second discrete layer (the $NO_x$ sorbent material) comprises an overlayer superposed on the underlayer. In any case, the discrete layers may be in direct contact one with the other or an intervening layer, e.g, alumina, may be interposed between the two discrete layers.

Still other aspects of the present invention provide one or more of the following features: the $NO_x$ abatement catalyst may comprise, in addition to the platinum catalytic metal component, one or more other platinum group metal catalytic components; the refractory support material may comprise a refractory metal oxide; and the $NO_x$ sorbent material may comprise a metal oxide selected from the group consisting of oxides of one or more of magnesium, calcium, strontium and barium.

Yet another aspect of the invention provides that the refractory carrier, e.g., made of cordierite, comprises a body having a plurality of gas flow passages extending therethrough, the passages being defined by passage walls, and the $NO_x$ abatement catalyst and the $NO_x$ sorbent material, e.g., the first and second layers, are disposed on the passage walls.

Still another aspect of the invention provides that the refractory carrier comprises a body of carrier beads retained within a gas-permeable container. In such case, the $NO_x$ abatement catalyst and the $NO_x$ sorbent material, e.g., the first and second layer may be arranged so that the first layer is disposed on one increment of carrier beads and the second layer is disposed on a second increment of carrier beads, with the first and second increments of carrier beads admixed within the container. Alternatively, the first and second layers may be disposed on the same increment of carrier beads or the $NO_x$ abatement catalyst and the $NO_x$ sorbent material may also be mixed on the same increment of carrier beads.

In accordance with the method aspect of the present invention there is provided a method of $NO_x$ abatement comprising contacting a gas stream containing $NO_x$ with a $NO_x$ abatement composition as defined above. The method includes periodically adjusting the composition of the gas stream between lean and stoichiometric/rich conditions to thereby provide alternating lean operating condition periods and stoichiometric/rich operating condition periods, and maintaining $NO_x$ abatement conditions during the stoichiometric/rich operating condition periods, whereby during the lean operating periods the $NO_x$ abatement catalyst promotes sorption of $NO_x$ by the $NO_x$ sorbent material and during the rich operating periods the $NO_x$ abatement catalyst promotes reduction of $NO_x$ to nitrogen.

As used herein and in the claims, the following terms, whether used in singular or plural form, have the indicated meanings.

Reference herein and in the claims to the $NO_x$ abatement catalyst and the $NO_x$ sorbent material being "in proximity to each other on a common refractory carrier member" means that the $NO_x$ abatement catalyst and the $NO_x$ sorbent material are either admixed with each other, or disposed in respective superposed layers, on the same carrier member.

When a component, such as ceria or the $NO_x$ sorbent material, is described as a "bulk" component, this means that the component is present as solid particles thereof. These particles are usually very fine, on the order of at least 90 percent of the particles being from about 5 to 15 microns in diameter. The term "bulk" is intended to distinguish from the situation in which a component is "dispersed" on a refractory support material by being impregnated into the support material from a solution or other liquid dispersion of the component. For example, it is well-known in the art to stabilize activated alumina (predominantly γ-alumina), which is used as a refractory support material, against thermal degradation in TWC and other catalyst compositions by impregnating the particles of alumina with the solution of a soluble cerium compound such as a solution of cerium nitrate. After impregnation, the alumina particles are dried and calcined in air to convert the impregnated cerium nitrate to ceria. The resultant ceria is thus "dispersed" onto and, to a greater or lesser extent, within a surface layer of the solid particles of the alumina. The dispersed ceria is not present in bulk form, because bulk ceria comprises fine, solid particles of ceria.

Reference to components which are not being dispersed on "the same increment" or "increments" of refractory support material simply means that the components are not dispersed on the same particles of refractory support materials. For example, consider a situation in which a catalytic metal component is dispersed onto one batch of alumina particles and a $NO_x$ sorbent material is dispersed onto a second, different batch of alumina particles. This situation would result in the catalytic metal component and the $NO_x$ sorbent material being dispersed on "different increments" of alumina. This situation differs from that described, for example, in the aforementioned Funabiki et al U.S. Pat. No. 5,202,300 wherein, following the procedure of Example 1 thereof, the palladium and rhodium catalytic metal components are dispersed onto alumina particles and thereafter a strontium compound (as well as other compounds) are dispersed onto the same alumina particles onto which the palladium and rhodium catalytic components are dispersed. In that case, the platinum/rhodium and strontium compounds are dispersed onto the same increment of alumina.

Reference to a "catalytic metal component" means a catalytic metal, such as a platinum group metal, whether the metal is present as the element, or alloy or a compound, e.g., an oxide, and which is effective to catalyze $NO_x$ abatement in a gas stream.

The term "platinum group metals" means and includes platinum, rhodium, palladium, ruthenium, iridium and osmium.

The term "washcoat" has its usual meaning in the art of a thin, adherent coating of a catalytic or other material applied to a refractory carrier material such as a honeycomb-type carrier member, and which is porous to permit the passage therethrough of the gas stream being treated.

The term "stoichiometric/rich" is used with reference to the condition of the gas stream being treated and refers collectively to the stoichiometric and rich operating conditions of the gas stream.

The term "gas stream" means a stream of gaseous constituents, such as the exhaust of an internal combustion engine, which may contain entrained non-gaseous components such as liquid droplets, solid particulates and the like.

The term "mixed metal oxide" means bimetallic or multi-metallic oxygen compounds, such as $Ba_2SrWO_6$, which are true compounds and is not intended to embrace mere mixtures of two or more individual metal oxides such as a mixture of SrO and BaO.

BRIEF DESCRIPTION OF THE DRAWINGS

FIG. 1C is a cross-sectional schematic partial view of a carrier body comprising a gas-permeable container within which are disposed a plurality of carrier beads in accordance with one embodiment of the present invention; and FIGS. 2–12 show various graphs plotting test data comprising (except for FIG. 2A) $NO_x$ removal versus the gas stream temperature at the inlet to the composition being tested, for certain embodiments of the present invention and for certain comparative compositions; FIG. 2A plots $NO_x$ removal versus time.

DETAILED DESCRIPTION OF THE INVENTION AND SPECIFIC EMBODIMENTS THEREOF

Figure 1:
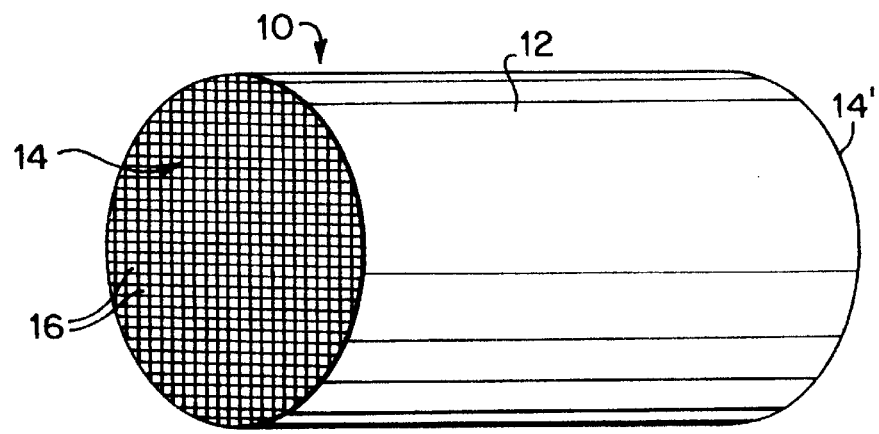
FIG. 1 is a perspective view of a catalyst/trap composition comprising a honeycomb-type refractory carrier member in accordance with one embodiment of the present invention.

Contrary to some teachings of the prior art, for example, the discussion in the above-mentioned Takahashi et al and SAE papers, it has surprisingly been found that an exceedingly effective and durable composition for the abatement of $NO_x$ in a gas stream is provided by a composition comprising a $NO_x$ sorbent material and one or more catalytic metal components, essentially including a platinum catalytic metal component, in which the $NO_x$ sorbent material is in proximity to but segregated from the catalytic metal component or components. In one embodiment of the invention, both the catalytic metal component or components and the $NO_x$ sorbent material or materials are dispersed onto different respective increments or batches of support material, such as activated alumina. In this embodiment, the $NO_x$ sorbent material is dispersed onto a first batch of refractory support material to provide a "supported $NO_x$ abatement material" and the catalytic metal component is dispersed onto a second batch of refractory support material. Ceria, either in dispersed or bulk form, is often used as an oxygen-storage component of three-way conversion catalysts and therefore may be a component of the $NO_x$ abatement catalyst, although the $NO_x$ abatement catalyst will in such case necessarily also contain other catalytic metal components effective for $NO_x$ abatement.

In another embodiment of the invention which is preferred because it is believed that it provides enhanced $NO_x$ sorption and release characteristics, the $NO_x$ sorbent material is provided in bulk form, i.e., as discrete fine particles of the $NO_x$ sorbent material, to provide a "bulk $NO_x$ sorbent material". In this embodiment, the composition comprises refractory support material such as particles of activated alumina impregnated with the catalytic metal component, and particles of the $NO_x$ sorbent material, i.e., in bulk form.

Whichever of the two above-described embodiments of the present invention is employed, either embodiment may be employed as a mixture of the $NO_x$ abatement catalyst and $NO_x$ sorbent material or as discrete layers of the $NO_x$ abatement catalyst and $NO_x$ sorbent material. The requisite segregation of the abatement catalyst and sorbent material is attained in a mixture of the $NO_x$ abatement catalyst with either the supported $NO_x$ sorbent material or bulk $NO_x$ sorbent material because in both cases the catalytic metal component is supported on particles of support material which do not also support $NO_x$ sorbent material and the $NO_x$ sorbent material does not support any catalytic metal component. Of course, when the $NO_x$ sorbent material, whether supported or bulk, is disposed in a discrete layer separate from a second discrete layer of $NO_x$ abatement catalyst, a still higher degree of segregation is attained. The degree of segregation may be further enhanced by disposing an intermediate washcoat layer between the layers of abatement catalyst and support material. However, it has been found that an excessive degree of segregation of the (1) $NO_x$ abatement catalyst and (2) the $NO_x$ sorbent material, such as that attained by depositing (1) and (2) on respective, separate carrier members dispersed in series gas flow, yielded very poor results. The segregated components (1) and (2) are therefore, in accordance with the present invention, disposed on a common carrier member in proximity to each other.

In a specific embodiment, the composition of the present invention may comprise a refractory carrier member such as a honeycomb-type member comprising a unitary body made of a suitable material such as cordierite and having a plurality of fine, parallel gas flow passages extending therethrough from an inlet face to an outlet face of the member. The walls defining these fine gas flow passages may be coated in a manner well-known in the art with a washcoat comprising either a mixture of fine particles of the $NO_x$ abatement catalyst and $NO_x$ sorbent material, or the walls may be coated with a respective discrete layer of $NO_x$ abatement catalyst and a respective discrete layer of $NO_x$ sorbent material. The $NO_x$ abatement catalyst is preferably disposed as a first or underlayer on the carrier with the $NO_x$ sorbent material being disposed as a second overlayer superposed on the underlayer. Optionally, the two layers may be separated by an intermediate layer, such as an intermediate layer of one or more of alumina, zirconia, ceria, titania or other suitable refractory metal oxide. Alternatively, the two layers may be in "direct contact" with each other, by which is meant that there is no intervening layer of another material between the respective catalyst and sorbent material layers.

Figure 1A:
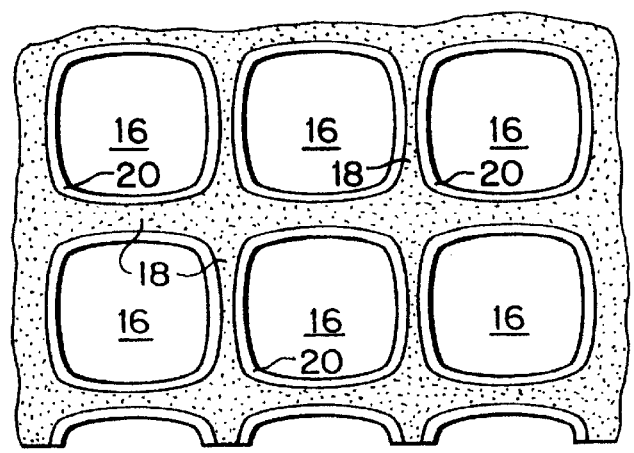
FIG. 1A is a partial cross-sectional view enlarged relative to FIG. 1 and taken along a plane parallel to the end faces of the carrier of FIG. 1.
Figure 1B:
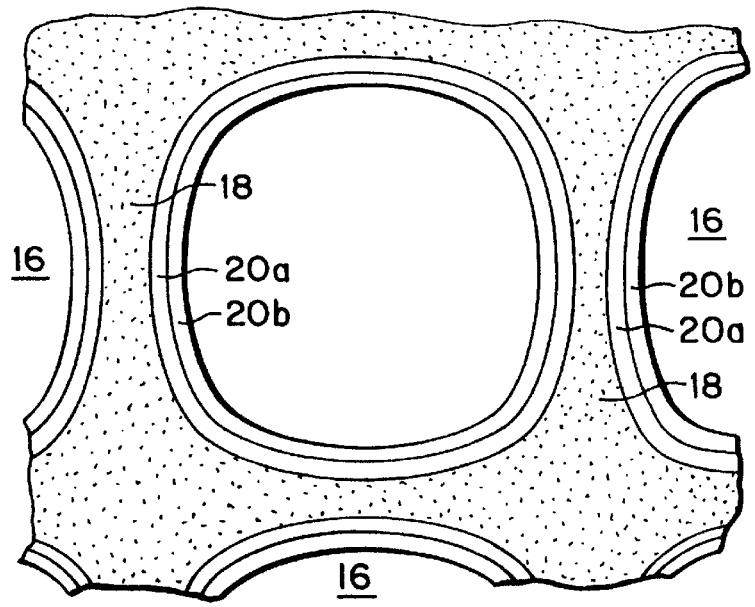
FIG. 1B is a view enlarged relative to FIG. 1A of one of the gas flow passages shown in FIG. 1A.

FIG. 1 shows generally at 10 a refractory carrier member of generally cylindrical shape having a cylindrical outer surface 12, one end face 14 and an opposite end face, not visible in FIG. 1, which is identical to end face 14. The junction of outer surface 12 with the opposite end face at its peripheral edge portion is indicated at 14' in FIG. 1. Carrier member 10 has a plurality of fine, parallel gas flow passages 16 formed therein, better seen in enlarged FIG. 1A. Gas flow passages 16 are formed by walls 18 and extend through carrier 10 from end face 14 to the opposite end face thereof, the passages 16 being unobstructed so as to permit the flow of a fluid, e.g., a gas stream, longitudinally through carrier 10 via gas flow passages 16 thereof. As will be seen from FIGS. 1A and 1B walls 18 are so dimensioned and configured that gas flow passages 16 have a substantially regular polygonal shape, substantially square in the illustrated embodiment, but with rounded corners in accordance with U.S. Pat. No. 4,335,023, issued Jun. 15, 1982 to J. C. Dettling et al. A layer 20, which in the art and sometimes below is referred to as a "washcoat", is adhered to the walls 18 and, as shown in FIG. 1B, may be comprised of a single layer comprising a mixture of $NO_x$ abatement catalyst and $NO_x$ sorbent material. Alternatively, as illustrated in FIG. 1B, layer or washcoat 20 may comprise a first discrete layer or underlayer 20a and a second discrete layer or overlayer 20b superposed over first layer 20a. The first layer or washcoat 20a preferably is comprised of the $NO_x$ abatement catalyst and the second layer or washcoat 20b is preferably comprised of the $NO_x$ sorbent material and is superposed over layer 20a. However, the arrangement of the layers may be reversed, with the first layer 20a comprised of the $NO_x$ sorbent material and the second layer 20b comprised of the $NO_x$ abatement catalyst. For purposes of illustration, the thickness of layers 20, 20a and 20b are exaggerated in FIGS. 1A and 1B.

As shown in FIGS. 1–1B, the honeycomb-type carrier members include void spaces provided by the gas-flow passages, and the cross-sectional area of these passages and the thickness of the walls defining the passages will vary from one type of carrier member to another. Similarly, the weight of washcoat applied to such carriers will vary from case to case. Consequently, in describing the quantity of washcoat or catalytic metal component or other component of the composition, it is convenient to use units of weight of component per unit volume of catalyst carrier. Therefore, the units grams per cubic inch ("g/in$^3$") and grams per cubic foot ("g/ft$^3$") are used herein to mean the weight of a component per volume of the carrier member, including the volume of void spaces of the carrier member.

The density of gas flow passages per unit surface area of the end faces of the carrier member is expressed herein as the number of cells (passages) per square inch, or "cpsi".

Generally, the $NO_x$ sorbent material comprises at least one basic oxygenated metal compound and, as indicated above, may either be dispersed onto a refractory support material such as activated alumina, or may be present in bulk form, i.e., as fine particles of the basic oxygenated metal compound. As used herein and in the claims, an "oxygenated metal compound" means a compound of metal and oxygen which may or may not contain other elements. For example, the basic oxygenated metal compound may comprise one or more of a metal oxide, a metal carbonate, a metal hydroxide or a mixed metal oxide. The metal of such compounds (at least one of the metals in the case of the mixed oxides) is preferably selected from the group consisting of one or more of lithium, sodium, potassium, rubidium, cesium, magnesium, calcium, strontium and barium. Strontium oxide has been found to be an especially useful $NO_x$ sorbent material. The $NO_x$ sorbent material will be present in an amount calculated to provide adequate sorption for the intended use. A typical quantity of the basic metal oxygenated compound will be from about 0.05 to 3 g/in$^3$.

The $NO_x$ sorbent material may optionally include a sulfur compound sorbent such as ceria, either as bulk ceria or as ceria dispersed into the particles of $NO_x$ sorbent material. In the latter case, the $NO_x$ sorbent material may be impregnated with a solution of a soluble cerium salt such as cerium nitrate and then dried and heated in air to convert the cerium nitrate to cerium oxide (ceria). It has been found that when present in either bulk or dispersed form, ceria facilitates coating the carrier member with a washcoat of the $NO_x$ sorbent material and also protects the basic oxygenated metal compounds comprising the $NO_x$ sorbent material from poisoning by sulfur oxides which may be present in the gas stream being treated as the sulfur oxides are preferentially sorbed on the ceria. The $NO_x$ sorbent material may thus advantageously contain ceria in a weight ratio of ceria to $NO_x$ sorbent material of from about 0.1 to 100:1. Typically, ceria may be present in the composition in the amount of from about 0.05 to 1.0 g/in$^3$, as $CeO_2$. The $NO_x$ sorbent material may also contain a binder such as alumina to enhance adherence of the $NO_x$ sorbent material to the carrier member.

The $NO_x$ abatement catalyst may comprise any catalyst which will catalyze the reduction of $NO_x$ in the presence of a suitable reductant, usually hydrocarbons or CO in the case of treating the exhaust from an internal combustion gasoline engine. Without intending to be bound by any particular theory, it is believed that the platinum catalytic metal component of the $NO_x$ abatement catalyst of the present invention serves a number of functions, including promoting the sorption of $NO_x$ by the $NO_x$ sorbent material during lean phase operation. In addition to catalyzing reduction of $NO_x$ during rich phase operation the platinum catalytic metal component is also believed to catalyze some $NO_x$ reduction during at least a part of the lean phase operation.

The $NO_x$ abatement catalyst may comprise a suitable catalyst containing a platinum catalytic metal component and, optionally, one or more other platinum group metal catalytic components. Typically, these will include one or more of rhodium and palladium although other platinum group metal components may also be employed. A suitable $NO_x$ abatement catalyst for utilization in accordance with the present invention is a conventional TWC catalyst which usually comprises one or more platinum group metal components including a platinum component dispersed on a refractory support. The refractory support is typically a refractory metal oxide such as activated alumina. TWC catalysts may also include a so-called oxygen storage component which may comprise bulk ceria or a base metal oxide such as an oxide of nickel, iron, manganese or copper. The art is replete with well-known TWC compositions. In a typical composition of the present invention, the amount of platinum group metal present will be from about 5 to 150, preferably from about 20 to 80 $g/ft^3$. Of that amount, platinum will typically comprise from about 4 to 125 $g/ft^3$, preferably from about 17 to 67 $g/ft^3$.

A typical method of manufacturing a catalyst composition in accordance with the present invention is to provide the $NO_x$ abatement catalyst as a first coating or layer on the walls of the gas flow passages of a suitable refractory carrier member such as a cordierite honeycomb carrier. This may be accomplished, as is well-known in the art, by impregnating fine particulate activated alumina with one or more catalytic metal components such as platinum or platinum and rhodium, drying and calcining the impregnated activated alumina particles and forming an aqueous slurry of these particles together with particles of bulk ceria. (As used herein, the term "activated alumina" has its usual meaning in the art of a relatively high surface area alumina, as compared, e.g., to α-alumina (alpha), comprising predominantly γ-alumina (gamma) although other phases such as η-alumina (eta) may also be present.) The activated alumina may have initially been thermally stabilized, as is well-known in the art, by impregnating it with, for example, a solution of a soluble salt of barium, lanthanum, rare earth metal or other known stabilizer precursor, and calcining the impregnated activated alumina to form a stabilizing metal oxide dispersed onto the alumina. Base metal catalysts may also have been impregnated into the activated alumina, for example, by impregnating a solution of nickel nitrate into the alumina particles and calcining to provide nickel oxide dispersed in the alumina particles.

The carrier member may then be immersed into the slurry of impregnated activated alumina and excess slurry removed to provide a thin coating of the slurry on the walls of the gas flow passages of the carrier. The coated carrier is then dried and calcined to provide an adherent coating of the $NO_x$ abatement catalyst to the walls of the passages thereof. The carrier may then be immersed into a slurry of fine particles of a basic oxygenated metal compound, for example, in an aqueous slurry of fine particles of bulk strontium oxide, and a second or overlayer coating of a $NO_x$ sorbent material is thus deposited over the first or underlayer of $NO_x$ abatement catalyst. The member is then dried and calcined to provide a finished catalyst composition in accordance with one embodiment of the present invention.

Alternatively, the alumina particles impregnated with the catalytic component may be mixed with bulk or supported particles of the $NO_x$ sorbent material in an aqueous slurry, and this mixed slurry of $NO_x$ abatement catalyst particles and $NO_x$ sorbent material particles may be applied as a coating to the walls of the gas flow passages of the carrier member.

In another embodiment of the present invention, the refractory carrier member may comprise a body of beads, pellets or particles (collectively referred to as "carrier beads") made of a suitable refractory material such as γ-alumina, coated with the $NO_x$ abatement catalyst and the $NO_x$ sorbent material. A body of such carrier beads may be contained within a suitable perforated container which permits the passage of the exhaust gas therethrough. FIG. 1C shows such an embodiment of the invention in which the carrier member 10' comprises a perforated metal container 11 enclosed on all sides by walls 22 within which is formed a regular pattern of perforations 22a. The interior of the container 11 is packed with a plurality of carrier beads 24 on which are disposed the $NO_x$ abatement catalyst and $NO_x$ sorbent material. The member 10' illustrated in FIG. 1C would be, as well-known to those skilled in the art, contained within a structure (not shown) designed to direct the flow of the gas stream being treated through member 10', as indicated in FIG. 1C by the unnumbered arrows. In one embodiment of the invention, a proportion, e.g., approximately one-half, of the carrier beads 24 may have the $NO_x$ abatement catalyst coated thereon and the remainder may have the $NO_x$ sorbent material coated thereon. The two different increments of carrier beads 24 are thoroughly admixed so that the $NO_x$ abatement catalyst and $NO_x$ sorbent material are more or less uniformly distributed throughout the interior of the container 11. In another embodiment, the same increment of carrier beads may be coated with both the $NO_x$ abatement catalyst and the $NO_x$ sorbent material, preferably in discrete respective layers thereof, and most preferably with the layer of $NO_x$ sorbent material superposed over the layer of $NO_x$ abatement catalyst.

Without wishing to be bound by any particular theory of operation, it is believed that when the gas stream, e.g., engine exhaust, to be treated is lean, $NO_x$ contained in the gas stream is sorbed onto the $NO_x$ sorbent material, thereby removing the sorbed $NO_x$ from the stream discharged to the atmosphere. The platinum catalytic component is believed to promote such sorption. This lean sorption occurs during a lean operating period which is terminated by rendering the gas stream rich, as may be accomplished by decreasing the air-to-fuel ratio of the combustible mixture fed to the engine generating the exhaust, or by directly introducing a suitable reductant such as hydrocarbons into the exhaust gas stream. The hydrocarbons or other suitable reductant in the gas stream will displace the sorbed $NO_x$ from the $NO_x$ sorbent material, and the displaced $NO_x$ contacts the $NO_x$ abatement catalyst in the presence of the reductant and otherwise under conditions (a suitable elevated temperature) such that the $NO_x$ is reduced. Some or all of the $NO_x$ may be reduced to nitrogen or to nitrogen and $N_2O$.

In accordance with the method aspect of the present invention, the exhaust gas is alternately adjusted between lean and stoichiometric/rich operating conditions so as to provide alternating lean operating periods and stoichiometric/rich operating periods. It will be understood that the gas stream, e.g., exhaust, being treated may be selectively rendered lean or stoichiometric/rich either by adjusting the air-to-fuel ratio fed to the engine generating the exhaust or by periodically injecting a reductant into the gas stream upstream of the catalyst. For example, the composition of the present invention is well-suited to treat the exhaust of diesel engines which continuously run lean. In such case, in order to establish a stoichiometric/rich operating period, a suitable reductant, such as diesel fuel, may be sprayed into the exhaust immediately upstream of the catalyst composition of the present invention. Such diesel fuel introduction will be carried out periodically so as to alternate lean and stoichiometric/rich periods of the exhaust. Even if the overall condition of the exhaust (or other gas stream) being treated is lean, stoichiometric/rich local conditions may be periodically imposed at and within the catalyst composition.

During the lean operating periods $NO_x$ is sorbed by the $NO_x$ sorbent material and such sorption may take place at temperatures of from about 150° C. to about 600° C. The sorbed $NO_x$ is desorbed during stoichiometric/rich operating periods and/or high temperature periods. The reduction of $NO_x$ during the stoichiometric/rich operating period is promoted by contact of the reactants with the $NO_x$ abatement catalyst under $NO_x$ abatement conditions, typically at temperatures of from about 200° C. to about 800° C. For gasoline, a stoichiometric air-to-fuel weight ratio ("A/F") is 14.6. Lambda ($\lambda$) is usually used to symbolize the ratio of the actual A/F to the stoichiometric A/F. Therefore, $\lambda=1$ is a stoichiometric A/F, $\lambda>1$ is lean and $\lambda<1$ is rich. Gasoline-fueled engine lean operation is usually at $\lambda=$about 1.03 to 1.30.

The following examples illustrate the preparation and testing of specific embodiments of the invention. It will be noted that the platinum group metal catalytic components are segregated from the $NO_x$ sorbent materials, in accordance with the teachings of the present invention. The following test procedure was employed.

Test Procedure A

Catalysts were tested as follows. A feed stream comprising 250 ppm NO, 333 ppm propylene (equivalent to 1000 ppm $C_1$), 10% steam, 10% $O_2$, 50 ppm $SO_2$ and balance nitrogen, giving a $C_1$ to $NO_x$ ratio of 4 to 1, was flowed through the catalyst, which had previously been heated in air to 100° C., at a space velocity of 25,000/h. The temperature was then ramped up at a rate of 10° C./minute up to a temperature of 600° C. and the exit gases were tested for $NO_x$ content. In the Figures showing plots of $NO_x$ removal versus temperature, the amount of $NO_x$ removal is the net of (1) $NO_x$ converted to innocuous gases ($N_2$ and $N_2O$) and sorbed by the $NO_x$ sorbent material, less (2) $NO_x$ desorbed from the $NO_x$ sorbent material. The amount of $NO_x$ removal is expressed as a percentage of the total $NO_x$ present in the inlet gas. A negative percentage indicates a net release of $NO_x$ from the sorbent material into the gas stream.

EXAMPLE 1

A. Eleven grams of a soluble platinum salt containing 18.2% Pt by weight was dissolved in 55 ml of deionized water. The resulting platinum salt solution was used to impregnate 100 g of γ-alumina having a BET (Brunnauer-Emmett-Teller) surface area of 150 square meters per gram ($m^2/g$). The platinum salt solution was added with continuous mixing to give an impregnated alumina containing 2% by weight Pt (dry basis). The sample was ball milled about 30 minutes following which five grams of acetic acid was added into the mix to fix the Pt onto the alumina surface. The mixture was then slurried with deionized water to make a slurry of 45% solids and the slurry was further milled in a ball mill to a particle size of 90% of the particles being less than 10 microns in diameter. The resulting slip is designated Slip A.

B. Slip A was coated onto a cylindrical cordierite carrier member measuring 1.5 inches in diameter by 3.0 inches in length and containing 400 cells per square inch ("cpsi"). The coated carrier member was then dried at 100° C. and calcined at 550° C. for two hours to give a washcoat weight of the calcined catalyst of 2 $g/in^3$ and a Pt loading of 70 $g/ft^3$. The resulting catalyst member provided a comparative platinum-containing abatement catalyst and was designated Catalyst C-1.

EXAMPLE 2

A. A 250 g quantity of the same type of alumina as used in Part A of Example 1 was thoroughly mixed with 750 g of strontium oxide (SrO) powder, i.e., bulk SrO. The SrO—$Al_2O_3$ mixture was slowly added to 2000 g of deionized water with mixing. The mixture was kept in an ice bath to prevent the added deionized water from boiling, and mixing was continued to bring the SrO—$Al_2O_3$ mixture to room temperature. Then 150 g of acetic acid (5% based on slurry weight) was added to the mixture followed by 150 g of Nyacol Al-20 alumina binder (5.1% based on dry solids weight). Mixing was continued for an additional 15 minutes. The resulting slurry was placed in a ball mill jar and ball milled overnight to a particle size of 90% of particles less than 10 micron. The solids level was adjusted with deionized water to 36% solids. The resulting sorbent material (or trap) slurry is designated Slip T-1.

B. The catalyst member C-1 of Example 1 was coated with Slip T-1 obtained in Part A of this Example 2. The coated member was then dried at 100° C. and calcined at 550° C. for 2 hours to provide a washcoat overlayer of 1 $g/in^3$ superposed over the $Pt/Al_2O_3$ layer(now an underlayer) of Catalyst C-1. The resulting composition provided an embodiment of the present invention comprising a bulk strontium oxide sorption material overlayer superposed over a platinum-containing abatement catalyst underlayer and was designated Catalyst E-1.

C. A conventional, commercially available three-way catalyst has a precious metal loading of 70 $g/ft^3$ comprised of Pt and Rh in a weight ratio of 5 to 1 Pt:Rh. The catalytic precious metals are dispersed on activated alumina and the catalyst has a washcoat loading (alumina plus Pt and Rh) of 2 $g/in^3$. The catalyst had been dried and calcined at 450° C. The slurry T-1 obtained in Part A of this Example 2 was coated over the TWC catalyst to provide, after drying at 100° C. and calcining at 550° C. for 2 hours, an sorbent material overlayer washcoat of 1 $g/in^3$ superposed over the $Pt/Rh/Al_2O_3$ underlayer. The resulting composition provided an embodiment of the present invention comprising a bulk strontium oxide sorbent material overlayer superposed on an underlayer comprising a platinum and rhodium-containing TWC catalyst, and was designated Catalyst E-2.

Figure 2:
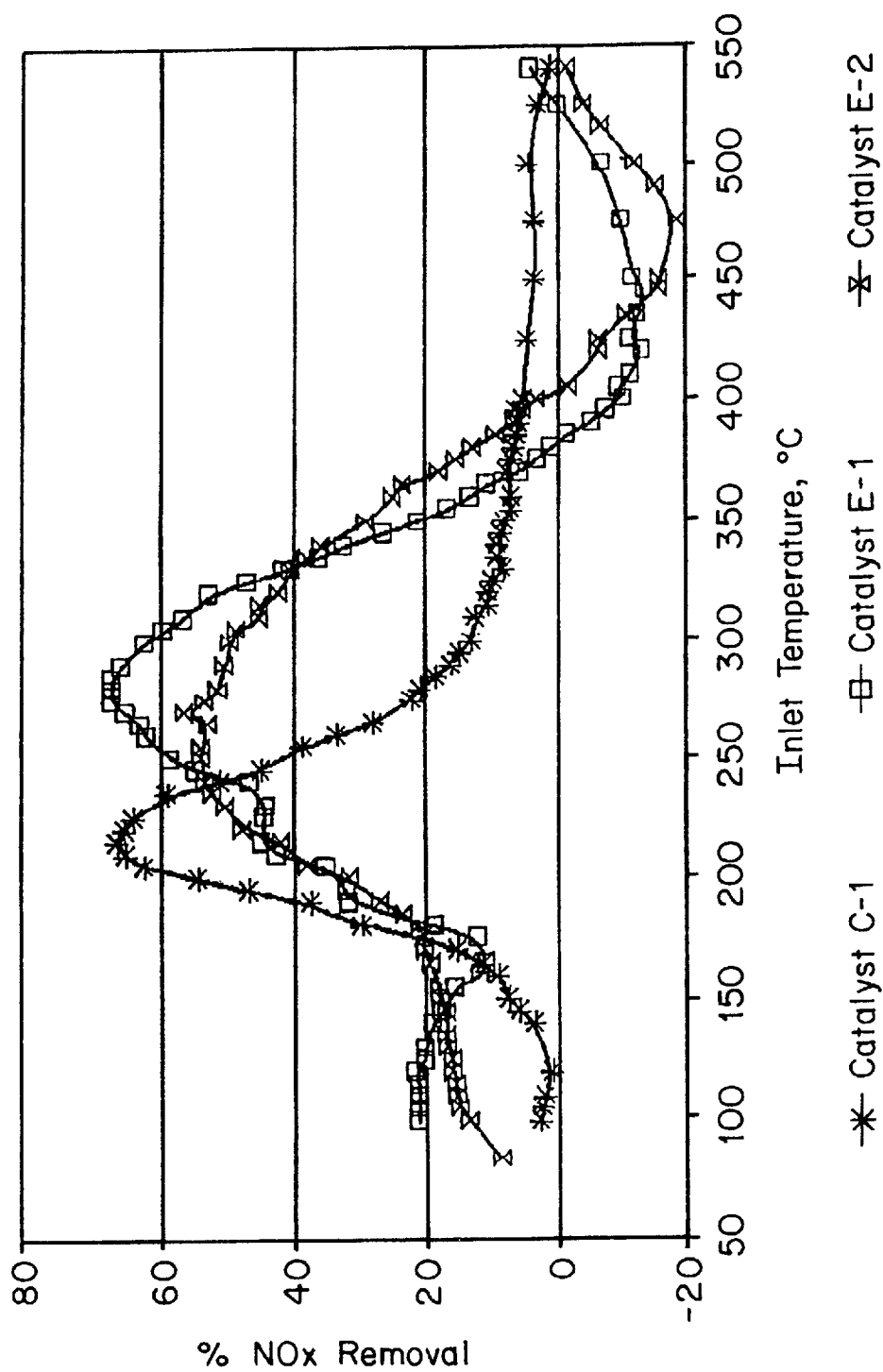

D. The results of testing Catalysts C-1, E-1, and E-2 under Test Procedure A are compared in FIG. 2, which shows that comparative Catalyst C-1 does not show any $NO_x$ sorption and shows some $NO_x$ conversion with a maximum $NO_x$ reduction at a temperature of about 200° C. of the gas stream at the inlet to the test catalyst. (All the temperatures shown in FIGS. 2–12 (including FIG. 2A) are temperatures of the test gas stream at the inlet to the catalyst member being tested. Reference in this and the following examples to the temperatures at which the events of $NO_x$ sorption and release occur are to such gas stream inlet temperatures, sometimes referred to simply as "inlet temperature(s)".) In contrast to the very poor performance of comparative Catalyst C-1, Catalyst E-1 and Catalyst E-2 comprising embodiments of the present invention showed reduction of $NO_x$ at an inlet temperature of about 200° C. with 20% $NO_x$ sorption at inlet temperatures between 100° and 150° C., as well as high sorption efficiency in the inlet temperature range of 250° to 400° C. The maximum $NO_x$ sorption was about 60% at an inlet temperature of 300° C. At inlet temperatures greater than 400° C., $NO_x$ was released as indicated by the negative $NO_x$ peak between 400° and 550° C. Comparison of Catalyst C-1 ($Pt/Al_2O_3$) with Catalyst E-1 (SrO coated over $Pt/Al_2O_3$) and E-2 (SrO coated over a TWC catalyst) clearly shows the increase in $NO_x$ sorption capacity of the SrO coated Catalysts E-1 and E-2 as compared to the comparative Catalyst C-1.

E. Catalyst E-1 was tested in accordance with Test Procedure B which comprises cycling the composition of the feed in a laboratory reactor between (1) rich and (2) lean. The test gas contained 250 ppm NO, 333 ppm $C_3H_6$ (1000 ppm Cl), 50 ppm $SO_2$, and 2% steam and was flowed through the catalysts at a space velocity of 25,000/hr while varying the oxygen concentration in the feed from zero (rich conditions) to 10% (lean conditions). The test was performed on a cylindrical cordierite carrier member having 400 cpsi measuring ¾ inch in diameter and 1 inch in length but otherwise identical to Catalyst E-1 and so this Example is also designated Catalyst E-1. The cycle was repeated for two cycles at inlet temperatures of 370°–390° C. and one cycle at inlet temperatures of 470°–500° C. The results are presented in FIG. 2A which shows that at lean conditions and at catalyst inlet temperatures of 370°–390° C. and 470°–500° C., the $NO_x$ was sorbed during the lean cycles. After about 10 minutes, the conditions were changed from lean to rich by replacing the $O_2$ flow with $N_2$ and keeping the space velocity fixed. The moment the feed turned rich, a portion of the sorbed $NO_x$ was released as $NO_x$ and a significant amount was reduced to innocuous gases.

EXAMPLE 3

The quantity of 204 g of $Sr(NO_3)_2$ was dissolved in 226 ml of deionized water and the resulting solution was added to 500 g of γ-alumina powder. The thus-impregnated powder was dried at 100° C. and calcined at 550° C. for 2 hours and allowed to cool. The quantity of 200 g of the SrO impregnated alumina was slurried in 226 ml of deionized water with 10 g of acetic acid and the mixture was ball milled to a particle size of 90% less than 10 microns. The resulting $SrO/Al_2O_3$ slurry was coated onto a sample of Catalyst C-1 of Example 1. The coated catalyst was then dried at 100° C. and calcined at 550° C. for 2 hours to provide an overlayer of 1 $g/in^3$. The resulting composition provided an embodiment of the present invention comprising a dispersed (not bulk) SrO sorption material overlayer superposed on an underlayer of Catalyst C-1 and was designated Catalyst E-3.

Figure 3:
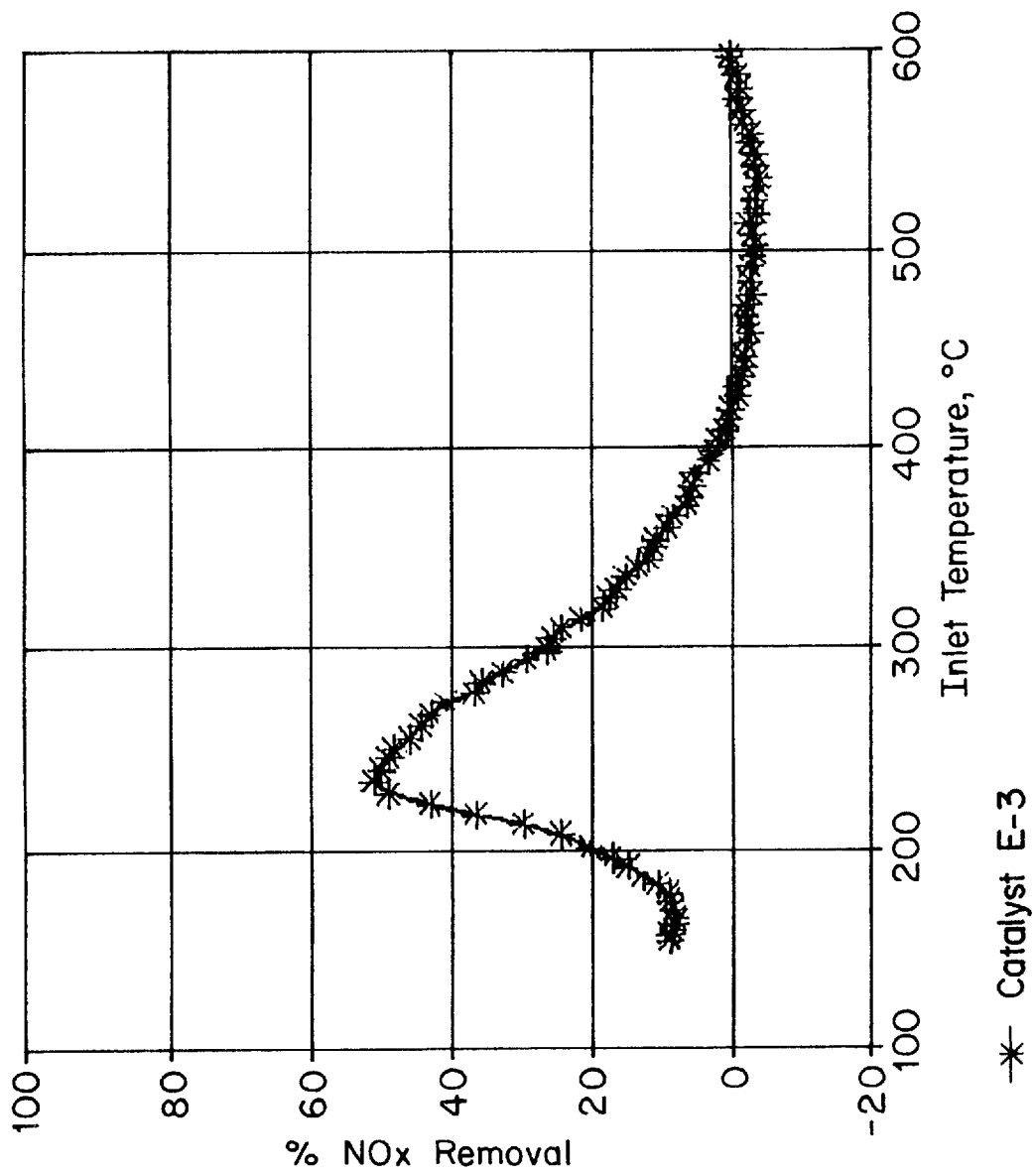

Catalyst E-3 was tested in accordance with Test Procedure A and the results are given in FIG. 3, which shows that $NO_x$ removal was attained with a peak at an inlet temperature of about 240° C. and a release of desorbed $NO_x$ at an inlet temperature of about 420° C.

EXAMPLE 4

The quantity 198 g of $Sr(OH)_2$ was mixed with 25 g of the same type of alumina as used in Example 1 as a binder and then slurried with 100 ml of deionized water and ball milled to a particle size of 90% of the particles having a diameter of less than 10 microns. The slurry was then coated onto a sample of Catalyst C-1 of Example 1. The $Sr(OH)_3$ and $Al_2O_3$ slurry was coated over the $Pt/Al_2O_3$ underlayer of Catalyst C-1. The sample was then dried at 100° C. and calcined at 550° C. for 2 hours to provide an overlayer of 0.7 $g/in^3$. The resulting catalyst provided an embodiment of the present invention comprising a bulk strontium hydroxide sorption material layer superposed on a platinum-containing abatement catalyst, and was designated Catalyst E-4.

Figure 4:
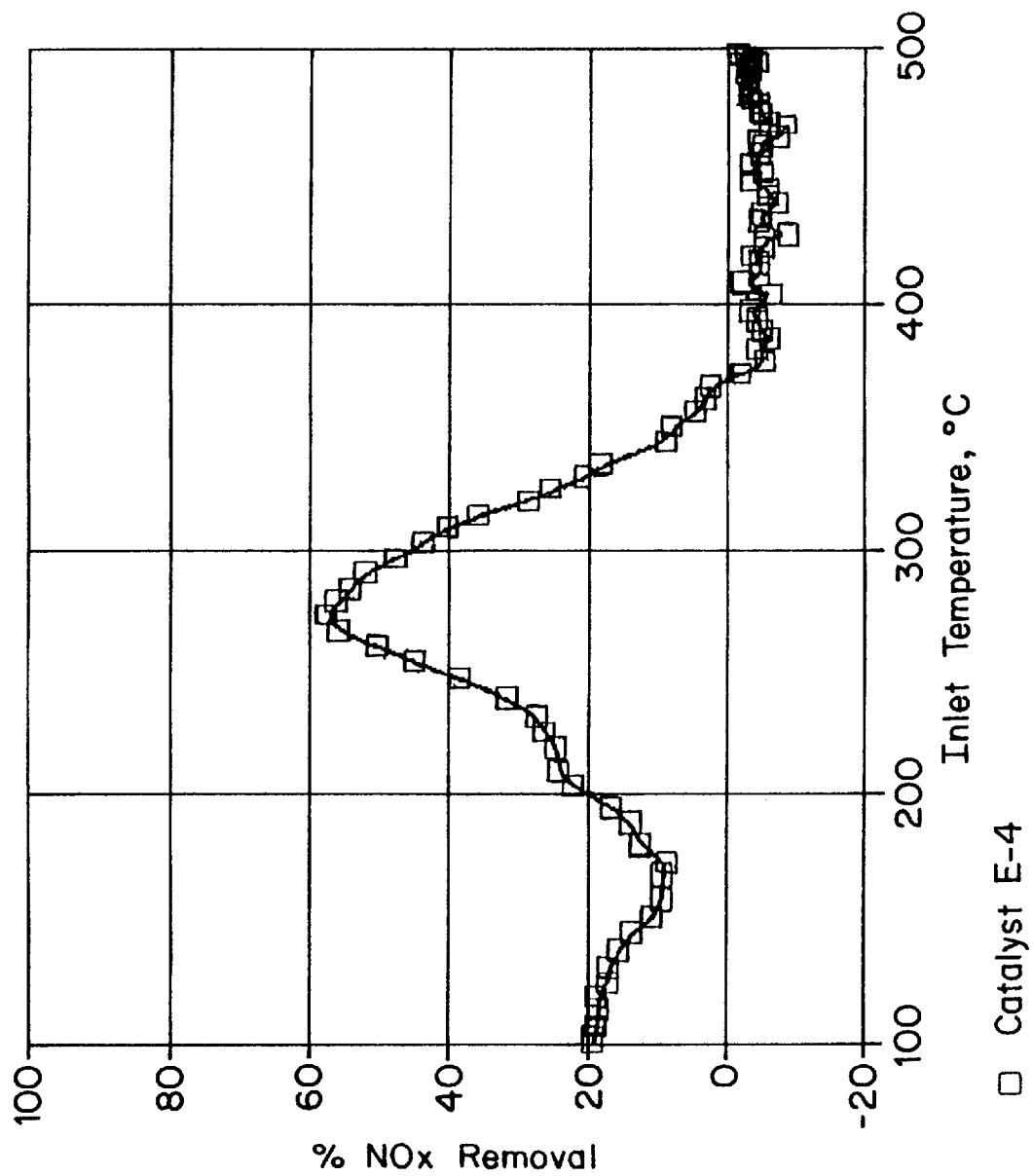
Figure 5:
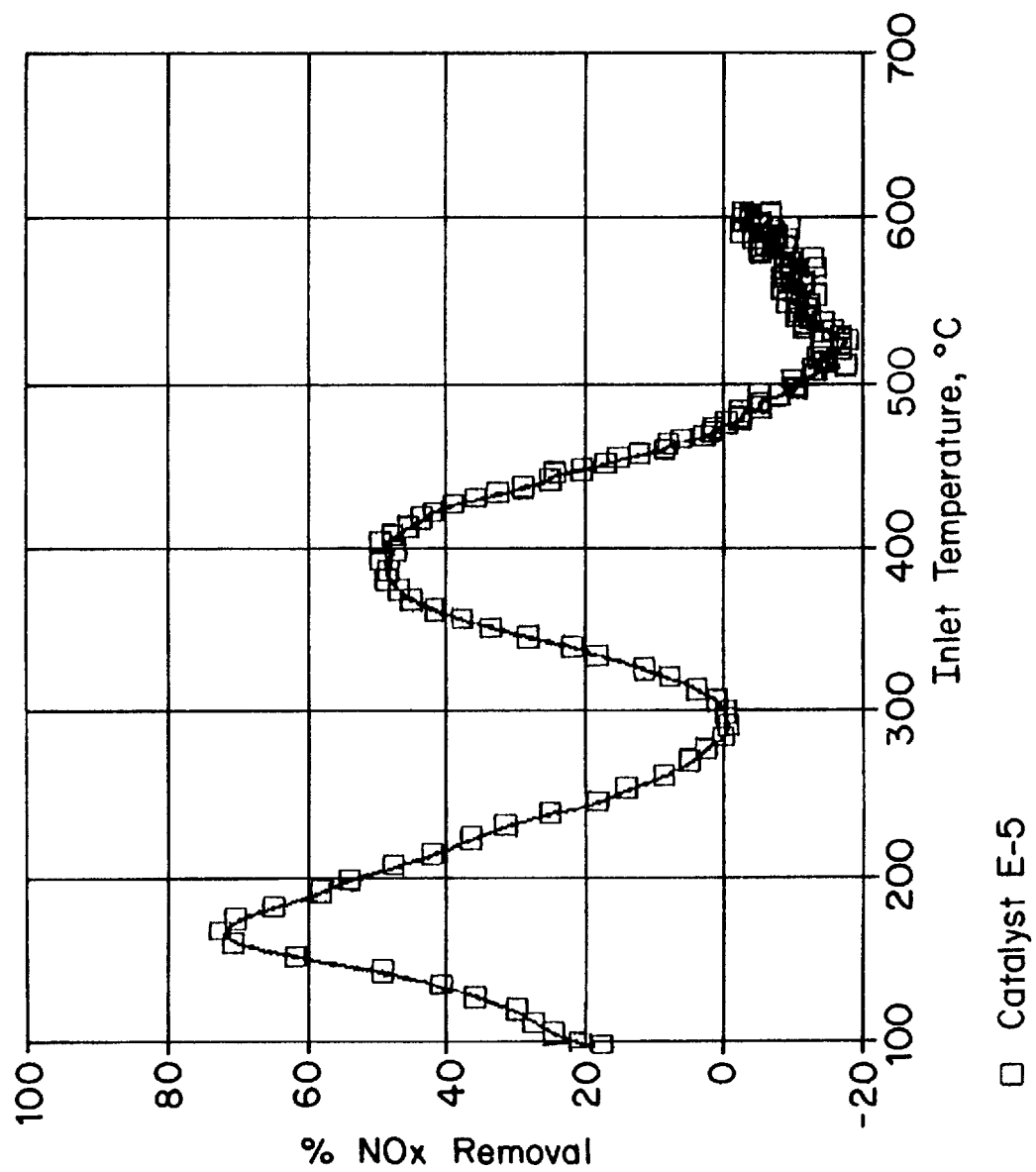

Catalyst E-4 was tested according to Test Procedure A and the results are given in FIG. 4. It is clear from the results, which show a removal peak for $NO_x$ at an inlet temperature of about 280° C. that the provision of an overlayer $Sr(OH)_2$ on the $Pt/Al_2O_3$ underlayer results in a high $NO_x$ sorption and reduction capacity.

EXAMPLE 5

Two hundred grams of a slurry of 35% solids of SrO powder in deionized water was mixed with 70 g of $CeO_2$ powder and deionized water was added to make a 40% solids slurry. The resulting mixture was added to 300 ml of deionized water and ball milled for 24 hours to provide a particle size of 90% of the particles being less than 10 microns in diameter. This slurry was coated over a sample of Catalyst C-1 of Example 1. The coated catalyst was then dried at 100° C. and calcined at 550° C. for 2 hours to provide an overlayer washcoat loading of 1.3 $g/in^3$ superposed over the $Pt/Al_2O_3$ underlayer of Catalyst C-1. The resulting composition provided an embodiment of the present invention comprising an sorbent material overlayer of a mixture of striontium oxide and bulk ceria superposed on a platinum-containing abatement catalyst and was designated Catalyst E-5.

Catalyst E-5 was tested using the same gas feed and flow as in Test Procedure A except that the propylene was not included, i.e., no hydrocarbon was included in the feed. The results are given in FIG. 5. It is clear from the results that this material showed excellent $NO_x$ removal, peaking at inlet temperatures of about 180° C. and 400° C. $NO_x$ desorption starts at an inlet temperature of about 480° C.

EXAMPLE 6 (Comparative)

A soluble platinum salt was added to a ball mill containing Slip T-1 from Part A of Example 2 (Slip T-1 contains 75 weight % SrO and 25 weight % $Al_2O_3$) to give 2% by weight Pt dispersed on Slip T-1. This provided 70 $g/ft^3$ Pt in the finished catalyst. The sample was ball milled about thirty minutes, 5% by weight (based on the weight of the slurry) acetic acid was added and the slip was further ball milled to a particle size of 90% of the particles having a diameter of less than 10 microns. The resulting slip was coated onto 400 cpsi cordierite carrier members measuring 0.75 inches in length and 1.0 inches in diameter, dried and calcined at 550° C. for 2 hours to give 2 $g/in^3$ of washcoat loading. The resulting comparative sample provided a platinum catalytic component dispersed onto the bulk strontium oxide sorbent material, i.e., the platinum group metal catalytic component was not segregated from the sorbent material. The resulting comparative catalyst was designated Catalyst C-2.

Figure 6:
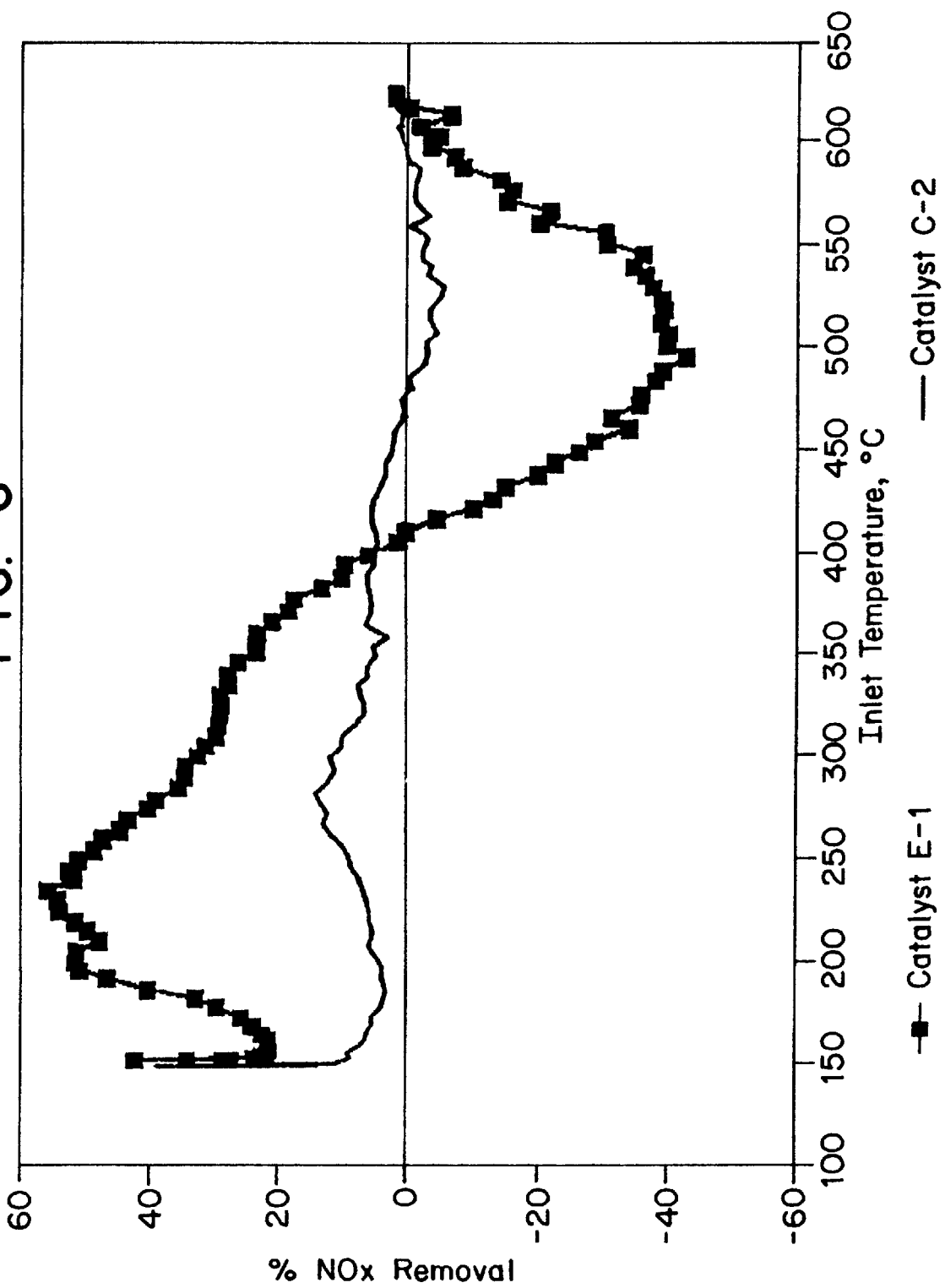

Catalyst testing results using Test Procedure A on comparative Catalyst C-2 and Catalyst E-1 of the present invention are shown in FIG. 6. It is clear from these results that impregnation of Pt on bulk Sro (as suggested by the Takahashi et al and SAE papers described above) does not give the superior $NO_x$ trapping and reduction performance which is obtained with Catalyst E-1. In fact, less than 10% $NO_x$ removal is observed over Catalyst C-2 at inlet temperatures of from about 150°–600° C., indicating that mixing of the catalytic and trapping functions by supporting the platinum catalytic metal component on the strontium oxide sorption material results in very poor efficiency for $NO_x$ removal.

EXAMPLE 7 (Comparative)

Activated alumina having a BET surface area of about 150 $g/M^2$ was impregnated with an aqueous solution of strontium nitrate. The impregnated powder sample was dried at 120° C. overnight and then calcined by heating from ambient temperature to 600° C. over a two-hour period and then held at 600° C. for an additional four hours to provide alumina containing 20% by weight (calcined basis) SrO. An aqueous slip of 35% solids was made from the resulting $NO_x$ sorbent material powder by adding the powder to deionized water to which sufficient platinum was added using an aqueous solution of a soluble platinum salt to provide 2% by weight Pt in the calcined product. Samples were prepared by coating 400 cpsi cordierite carrier members to give 2 g/in$^3$ of washcoat loading after calcination at 550° C. for 2 hours (i.e., 70 g/ft$^3$ Pt). The resulting comparative catalyst had the platinum catalytic metal component impregnated onto the same (alumina) support particles onto which the dispersed strontium oxide (via calcination of strontium nitrate) sorbent material was dispersed. Thus, the catalytic metal component, in this case a platinum catalytic metal component, was not segregated from the $NO_x$ sorbent material as required by the present invention. This comparative catalyst was designated Catalyst C-3.

Figure 7:
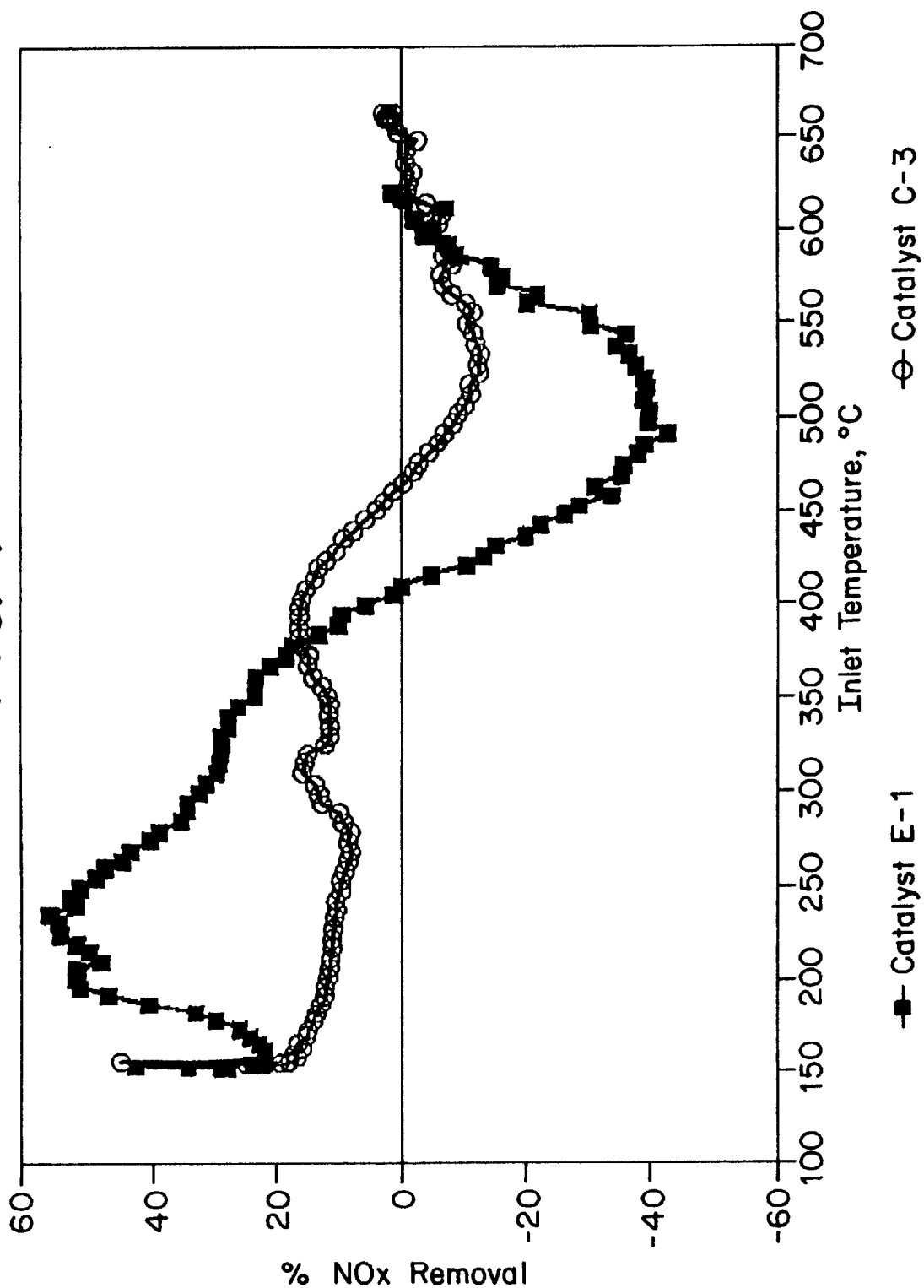

Catalyst testing results using Test Procedure A were carried out on comparative Catalyst C-3, along with Catalyst E-1 of the present invention and the results are shown in FIG. 7. Catalyst E-1 is seen to remove $NO_x$ over a broad inlet temperature range of from about 150°–400° C. with $NO_x$ release above this temperature, whereas Catalyst C-3 shows only minor, less than 15%, $NO_x$ removal at an inlet temperature range of from about 150°–300° C. and correspondingly much lower $NO_x$ release at higher temperatures. Thus, as also shown in Example 6, failure to segregate the platinum catalytic metal component and the strontium oxide $NO_x$ sorbent material component in the manner required by the teachings of the present invention, in this case by supporting both species on the same $Al_2O_3$ particles, results in poor $NO_x$ removal efficiency. As noted elsewhere herein, this is contrary to the teachings of the Takahashi et al and SAE papers noted above.

EXAMPLE 8

A. Mixed E-1

Seventy-five ml of Slip A of Part A of Example 1 diluted with deionized water to 37.2% solids, and 45.3 ml of Slip T-1 of Part A of Example 2 diluted with deionized water to 30.8% solids were thoroughly mixed together. The resulting slip was used to coat 400 cpsi cordierite carrier members to give 3 g/in$^3$ of washcoat loading after calcination at 550° C. for 2 hours to provide a catalyst having 70 g/ft$^3$ Pt. The result is a "mixed" version of Catalyst E-1 in which the $NO_x$ abatement catalyst and the $NO_x$ sorption material are not in discrete layers but are mixed in a single layer. The resulting sample is designated Catalyst E-1M, the "M" standing for mixed.

B. Reverse E-1

Slip T-1 of Part A of Example 2 was coated as an underlayer on 400 cpsi cordierite carrier members to give 1 g/in$^3$ washcoat after calcination at 550° C. for 2 hours. These carrier members were then further coated with 2 g/in$^3$ of Slip I as an overlayer containing 70 g/ft$^3$ of platinum and further calcined at 550° C. for 2 hours. The result is a version of Catalyst E-1 in which the layers are reversed relative to Catalyst E-1, i.e., the $NO_x$ sorbent material is the underlayer and the $NO_x$ abatement catalyst is the overlayer. The resulting sample is designated Catalyst E-1R, the "R" standing for reversed.

Figure 8:
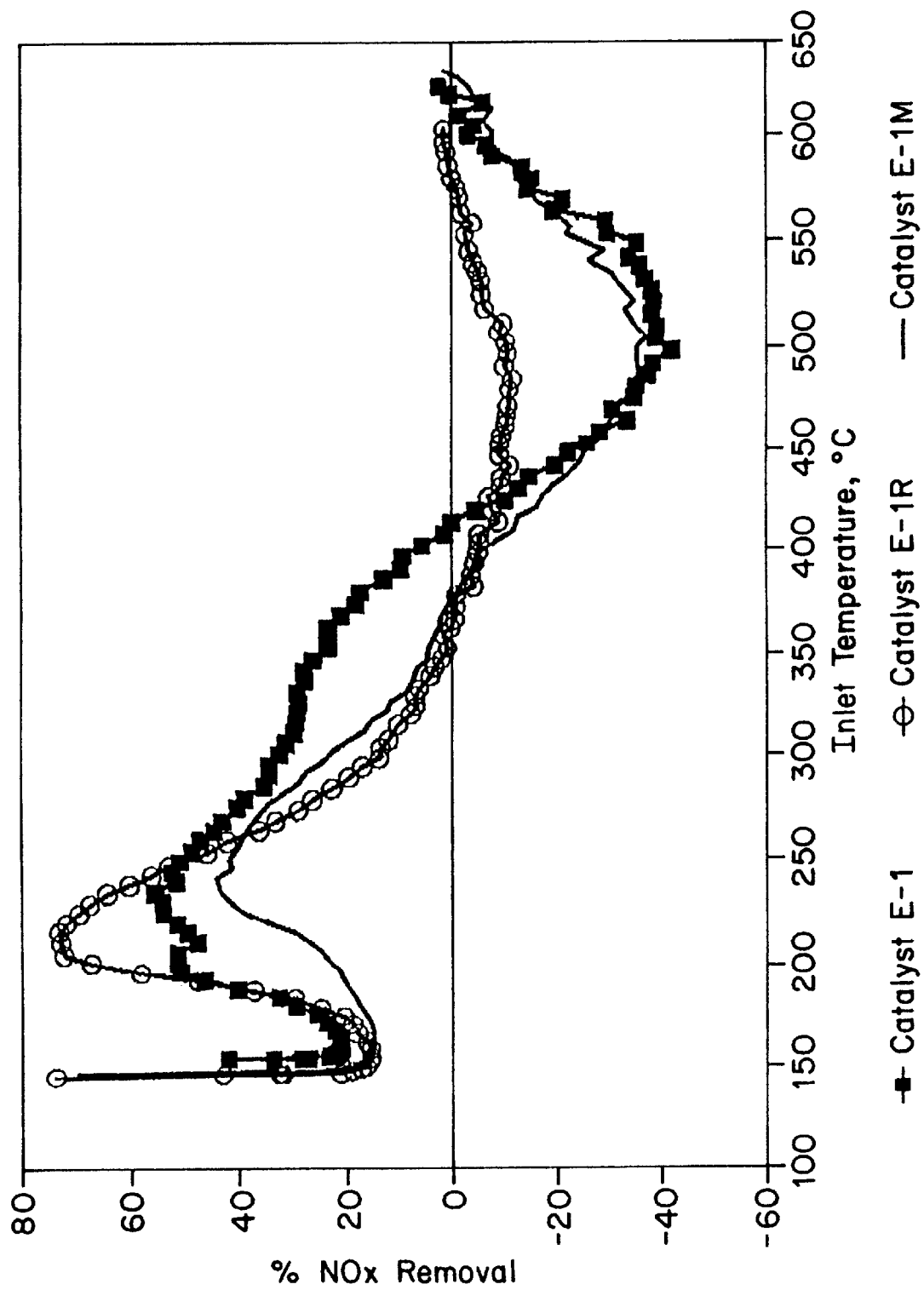

FIG. 8 shows the results of testing Catalysts E-1, E-1M and E-1R using Test Procedure A. Clearly from these results a layered structure with the $NO_x$ trapping component on the overlayer and the $NO_x$ abatement catalyst on the underlayer is preferred. It must be noted however that adequate $NO_x$ trapping and conversion is observed with the other two materials as well. Nonetheless, it is preferred to have the $NO_x$ sorbent material and the $NO_x$ abatement catalyst disposed in the layered structure exemplified by Catalyst E-1, wherein the $NO_x$ abatement catalyst is the underlayer.

EXAMPLE 9

A comparative material was made containing only the $NO_x$ sorbent material, as follows. Slip T-1 of Part A of Example 2 was coated onto a 400 cpsi cordierite carrier member which was then calcined at 550° C. for 2 hours to give a 1 g/in$^3$ washcoat. The resulting comparative was designated Catalyst C-4.

Figure 9:
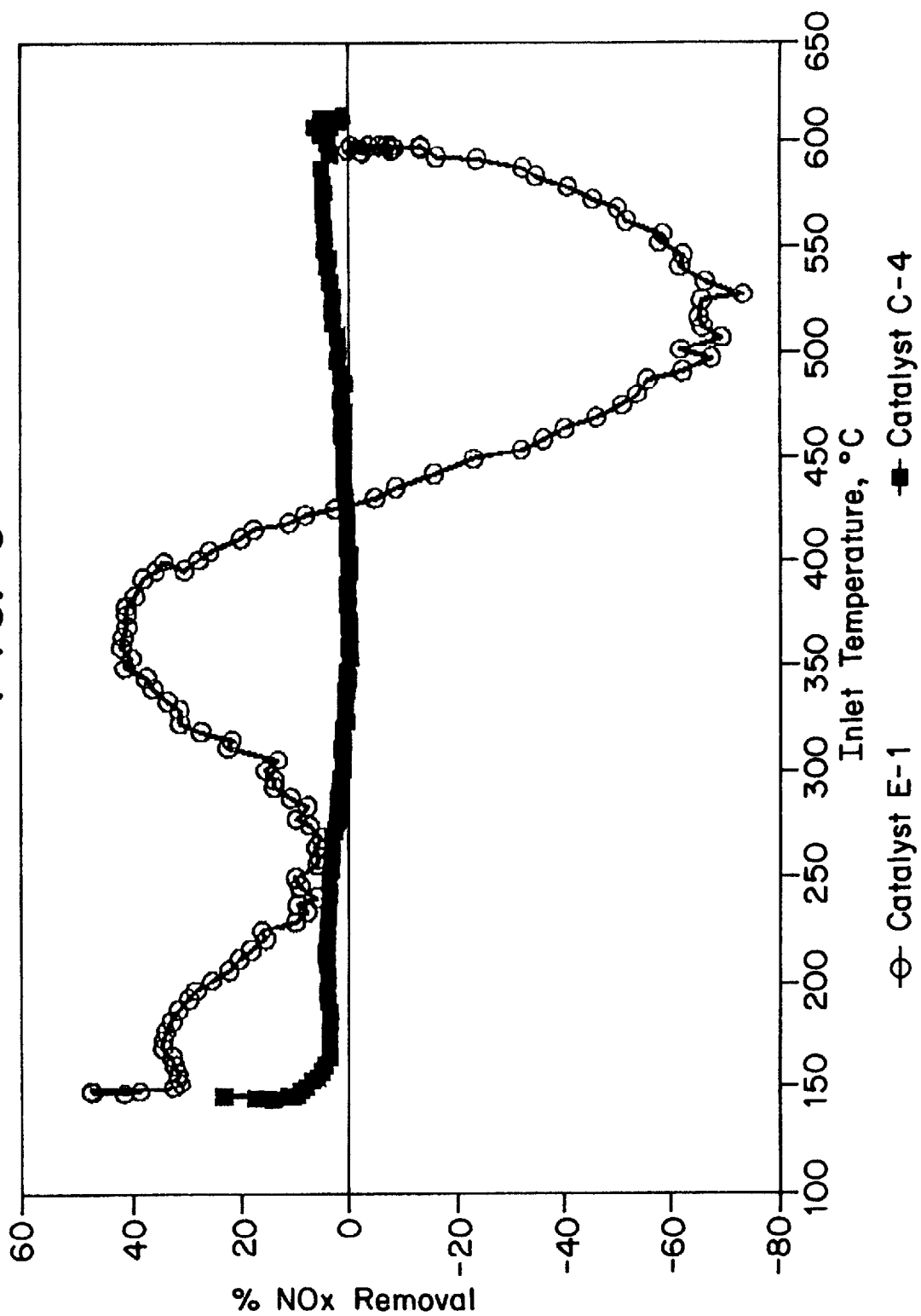

In FIG. 9, $NO_x$ removal over Catalyst E-1 and comparative Catalyst C-4 is compared using test conditions similar to those used in Test Procedure A except that no reductant is present. Because of the absence of hydrocarbons (or other reductant) in the feed gas, the $NO_x$ removals shown in this Figure result from $NO_x$ trapping alone, there being no $NO_x$ conversion, i.e., reduction of $NO_x$ by a reductant. Clearly from these results it is shown that the platinum group metal catalytic component in the underlayer of Catalyst E-1, plays a role in promoting $NO_x$ sorption by the $NO_x$ sorbent material, i.e., strontium oxide in this case. Very little $NO_x$ removal by comparative Catalyst C-4 is observed, i.e., less than 5% above an inlet temperature of 150° C., whereas the data for Catalyst E-1 show two $NO_x$ removal peaks at inlet temperatures of about 150° C. and about 360° C., each with over 30% $NO_x$ removal. At higher inlet temperatures, about 400°–575° C., a correspondingly large $NO_x$ desorption peak is shown for Catalyst E-1.

EXAMPLE 10

A calcined cordierite catalyst core, 400 cpsi, had a washcoat of 2 g/in$^3$ deposited from Slip A of Part A of Example 1 as an underlayer. An overlayer of 1 g/in$^3$ was applied using a slip prepared with 150 g $Ba_2SrO_6$, 50 g $Al_2O_3$, 31 g A-20 Nalco alumina binder (20% solids) and 180 g of deionized water. The resulting layered material was calcined to 550° C. for 2 hours. The resulting catalyst is designated Catalyst E-10.

Figure 10:
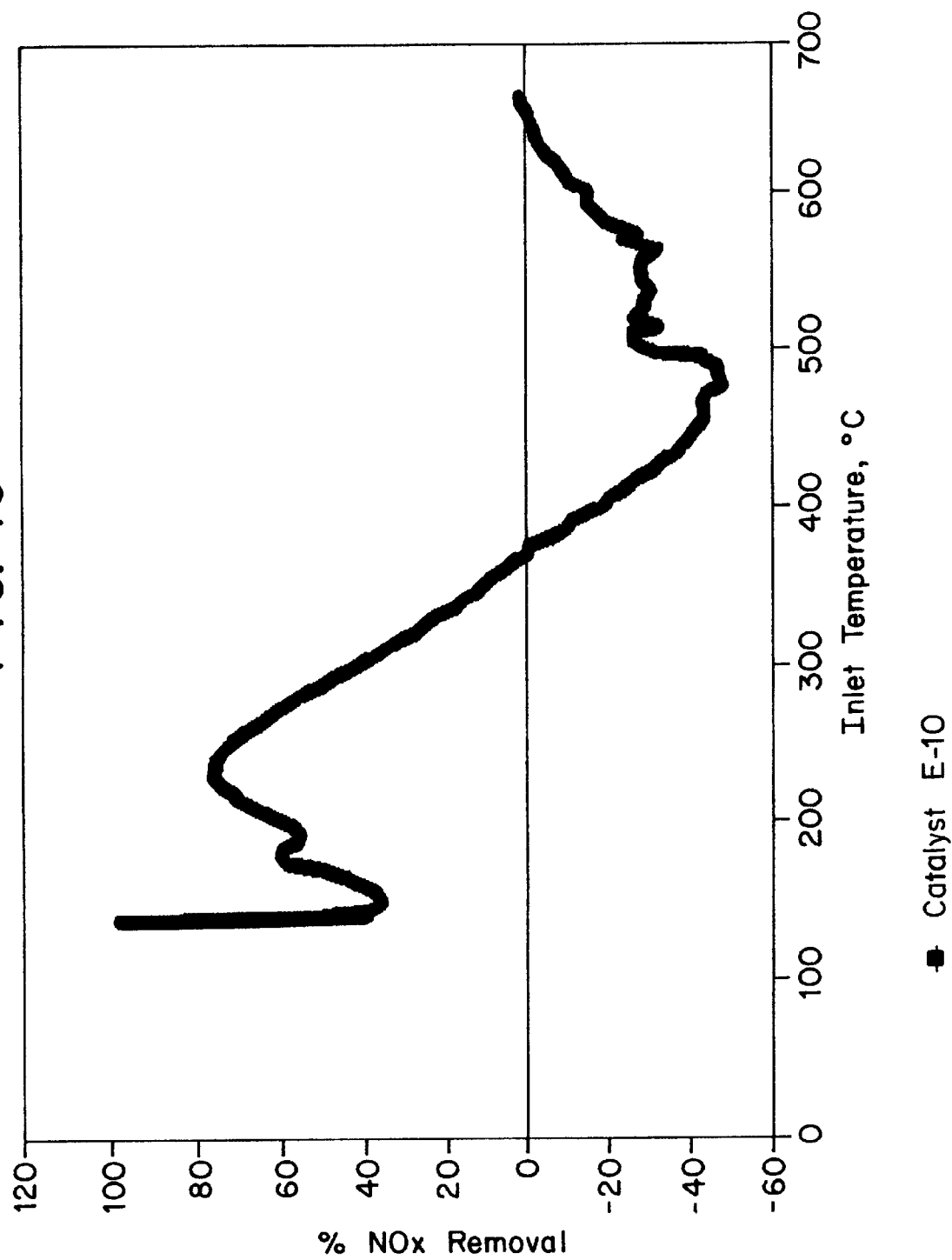

Catalyst E-10 was tested according to Test Procedure A for activity for $NO_x$ reduction and trapping and the test results are given in FIG. 10. Clearly this material is active for both $NO_x$ conversion and sorption over a fairly broad inlet temperature range of 100°–400° C. and releases $NO_x$ above an inlet temperature of about 400° C.

EXAMPLE 11

Lean/Rich Testing

Catalysts E-1 and E-10 were tested in an alternating rich/lean environment under the following conditions at the data point temperatures shown in FIGS. 11A and 11B. Thus, the data plotted in FIG. 11A were developed at inlet temperatures ranging from 200° C. to 450° C. at 50° C. intervals and the data plotted in FIG. 11B were developed at inlet temperatures of from 150° C. to 500° C. at 50° C. intervals.

Space Velocity=25,000/h

The inlet temperature was held steady for one-half hour at each of the temperatures shown in FIGS. 11A (200°–450° C., at 50° C. intervals) and 11B (150°–500° C., at 50° C. intervals).

Composition of Inlet Gas

NO=250 ppm H$_2$O=10% CO=1,000 ppm

C$_3$H$_6$=16.7 ppm SO$_2$=50 ppm H$_2$=330 ppm

O$_2$=0.07% (rich modes)⇌6.0% (lean modes)

The frequency of cycling between lean and rich modes was 60 seconds in each mode. Preconditioning of the test catalysts was carried out for about 30 minutes by subjecting the catalysts to the 60-second lean and rich periods at each test temperature. The results obtained for lean/rich testing of preconditioned Catalysts E-1 and E-10, are plotted in, respectively, FIGS. 11A and 11B. In these Figures the vertical lengths of the bars represent the range of NO$_x$ sorption observed during the lean pulses. The percentage of NO$_x$ removal at the start of a lean cycle is shown by the top of each vertical bar in FIGS. 11A and 11B, and the percentage of NO$_x$ removal at the end of each lean cycle is shown by the bottom of each vertical bar. The cyclic way in which the test was run ensures that during rich operating periods the catalyst was cleaned of stored NO$_x$ so that NO$_x$ sorption could occur again in the next lean operating period. Clearly, both Catalyst E-1 and Catalyst E-10 demonstrated the ability to sorb NO$_x$ over a broad temperature range for an extended period of time with alternating periods of rich and lean operation.

EXAMPLE 12

A. A catalyst sample was prepared identically to Catalyst C-1 of Part B of Example 1, the sole difference being that the washcoat loading of the calcined catalyst was 1.67 g/in$^3$.

B. An alumina slurry made of activated alumina was ball milled to 90% of the particles being less than 10 microns in diameter using 5% acetic acid in the slurry. The slurry contained 35% solids based on dried weight. The alumina was then coated over the catalyst obtained in Part A of this Example 12. The catalyst was then dried at 100° C. and calcined at 550° C. for 2 hours to provide 0.6 g/in$^3$ of an alumina washcoat layer in the calcined sample.

C. The calcined catalyst obtained from Part B of this Example 12 was then coated with Slip T-1 from Part A of Example 2. The coated catalyst was then dried and calcined at 550° C. for 2 hours to give a NO$_x$ sorbent material overlayer of 0.7 g/in$^3$. The total washcoat loading of the resulting three-layered catalyst was 3 g/in$^3$, having a NO$_x$ abatement catalyst underlayer of platinum dispersed on alumina, an intermediate layer of alumina, and an overlayer of NO$_x$ sorbent material comprised of bulk strontium oxide and bulk alumina. This catalyst was designated Catalyst E-12.

Catalyst E-12 was tested according to Test Procedure A. The results are plotted in FIG. 12 and clearly show that even with an intermediate layer separating the NO$_x$ sorbent material overlayer from the NO$_x$ abatement catalyst underlayer, catalyst E-12 demonstrated good efficiency of sorbing and converting NO$_x$. Note the high NO$_x$ removal at inlet temperatures from about 275° C. to 350° C. Sorbed NO$_x$ was released at temperatures greater than 375° C.

While the invention has been described in detail with respect to specific embodiments thereof, it will be appreciated that numerous variations to the specific embodiments may well occur to those skilled in the art upon a reading and understanding of the foregoing and it is intended to embrace such variations within the scope of the appended claims.

What is claimed is:

1. A method of NO$_x$ abatement comprising contacting a gas stream containing NO$_x$ with a NO$_x$ abatement composition, the composition comprising a NO$_x$ abatement catalyst and a NO$_x$ sorbent material disposed in proximity to each other on a common refractory carrier member, (i) the NO$_x$ abatement catalyst comprising a catalytic metal component comprised of platinum and, optionally, at least one other platinum group metal catalytic component, the catalytic metal component being dispersed on a first refractory metal oxide support, (ii) the NO$_x$ sorbent material optionally being a bulk material and comprising at least one material selected from the group consisting of basic oxygenated metal compounds and, optionally, further comprising ceria, and (iii) wherein the NO$_x$ sorbent material is segregated from the catalytic metal component, at least to the extent that (a) when the NO$_x$ sorbent material is dispersed on a refractory support material, the catalytic metal component and the NO$_x$ sorbent material are not dispersed on the same increment of refractory support material, and (b) when the NO$_x$ sorbent material comprises a bulk material, the catalytic metal component is not impregnated into the bulk NO$_x$ sorbent material and providing that when the catalytic material is disposed as a first discrete layer on the carrier member a second discrete layer of NO$_x$ sorbent material comprises an overlayer superimposed on the catalytic material layer;

the method including periodically adjusting the composition of the gas stream between lean and stoichiometric/rich conditions to thereby provide alternating lean operating condition periods and stoichiometric/rich operating condition periods, and maintaining NO$_x$ abatement conditions during the stoichiometric/rich operating condition periods, whereby during the lean operating periods NO$_x$ is sorbed by the NO$_x$ sorption material and during the stoichiometric/rich operating periods the NO$_x$ abatement catalyst promotes the reduction of NO$_x$.

2. The method of claim 1 wherein the NO$_x$ sorbent material comprises a mixed metal oxide selected from the group consisting of one or more of barium strontium tungstate, barium strontium niobate, strontium titanate, barium zirconate, barium silicate and barium strontium titanate.

3. The method of claim 1 wherein the NO$_x$ sorbent material is selected from the group consisting of one or more metal oxides, metal carbonates, metal hydroxides and mixed metal oxides, wherein the metals of the metal oxides, metal carbonates, metal hydroxides and at least one of the metals of mixed metal oxides are selected from the group consisting of one or more of lithium, sodium, potassium, rubidium, osmium, magnesium, calcium, strontium and barium.

4. The method of claim 1 wherein the NO$_x$ abatement catalyst further comprises at least one other platinum group metal catalytic component and the NO$_x$ sorbent material is selected from the group consisting of one or more of oxides of magnesium, calcium, strontium and barium.

5. The method of claim 1 wherein the NO$_x$ sorbent material comprises strontium oxide.

6. The method of claim 1 wherein the NO$_x$ abatement catalyst is disposed as a first discrete layer on the refractory carrier member and the NO$_x$ sorbent material is disposed as a second discrete layer on the carrier member.

* * * * *